(12) United States Patent
Tsuchiya

(10) Patent No.: US 8,203,783 B2
(45) Date of Patent: Jun. 19, 2012

(54) MICROSCOPE WITH SWITCHABLE CONDENSER ARRANGEMENT FOR DIFFERENT OBSERVATION METHODS

(75) Inventor: Atsuhiro Tsuchiya, Hachioji (JP)

(73) Assignee: Olympus Corporation, Tokyo (JP)

( * ) Notice: Subject to any disclaimer, the term of this patent is extended or adjusted under 35 U.S.C. 154(b) by 468 days.

(21) Appl. No.: 12/350,368

(22) Filed: Jan. 8, 2009

(65) Prior Publication Data

US 2009/0174938 A1 Jul. 9, 2009

(30) Foreign Application Priority Data

Jan. 8, 2008 (JP) ................................. 2008-001674

(51) Int. Cl.
*G02B 21/14* (2006.01)
(52) U.S. Cl. .......................... 359/371; 359/386; 359/388
(58) Field of Classification Search .......... 359/370–371, 359/386, 388
See application file for complete search history.

(56) References Cited

U.S. PATENT DOCUMENTS

| | | | | |
|---|---|---|---|---|
| 3,503,662 | A * | 3/1970 | Chalecki et al. ............... | 359/371 |
| 3,905,315 | A | 9/1975 | Sasaki | |
| 4,255,014 | A | 3/1981 | Ellis | |
| 4,363,532 | A * | 12/1982 | Weber ........................... | 359/381 |
| 4,407,569 | A | 10/1983 | Piller et al. | |
| 4,756,611 | A * | 7/1988 | Yonekubo et al. ............. | 359/370 |
| 5,128,808 | A | 7/1992 | Dosaka | |
| 5,539,573 | A * | 7/1996 | Schalz et al. .................. | 359/381 |
| 5,706,128 | A | 1/1998 | Greenberg | |
| 5,872,651 | A * | 2/1999 | Krueger et al. ............... | 359/370 |
| 5,969,853 | A * | 10/1999 | Takaoka ......................... | 359/370 |
| 6,130,776 | A * | 10/2000 | Takaoka ......................... | 359/370 |
| 6,323,995 | B1 * | 11/2001 | Takahama et al. ............ | 359/371 |
| 6,741,356 | B1 * | 5/2004 | Ishiwata et al. ............... | 356/491 |
| 7,505,200 | B2 * | 3/2009 | Krueger ......................... | 359/370 |
| 7,944,608 | B2 * | 5/2011 | Hayashi et al. ............... | 359/368 |

FOREIGN PATENT DOCUMENTS

| | | |
|---|---|---|
| DE | 4036065 A1 | 5/1991 |
| EP | 0069263 A1 | 1/1983 |
| EP | 0 075 860 A2 | 4/1983 |
| EP | 0069263 A1 | 1/1993 |
| JP | 51-29149 | 3/1976 |
| JP | 2001-264639 A | 9/2001 |
| JP | 2003-050353 A | 2/2003 |
| JP | 2004-109919 A | 4/2004 |

OTHER PUBLICATIONS

EESR dated May 10, 2010 in counterpart European Application No. 09000049.8.
Partial European Search Report dated May 8, 2009 (4 pages), issued in counterpart European Application Serial No. 09000049.8.

* cited by examiner

*Primary Examiner* — Mark Consilvio
(74) *Attorney, Agent, or Firm* — Holtz, Holtz, Goodman & Chick, PC

(57) ABSTRACT

A microscope includes a condenser lens that is provided in an illumination light path and in which at least one optical device is insertable into and removable from an illumination light axis for switching observation method. The microscope also includes a first polarizing plate that is provided in the same light axis as the optical device and is insertable into and removable from the illumination light axis integrally with the optical device; and a second polarizing plate that is provided in the illumination light axis independently from insertion and removal of the optical device into and from the illumination light axis.

8 Claims, 32 Drawing Sheets

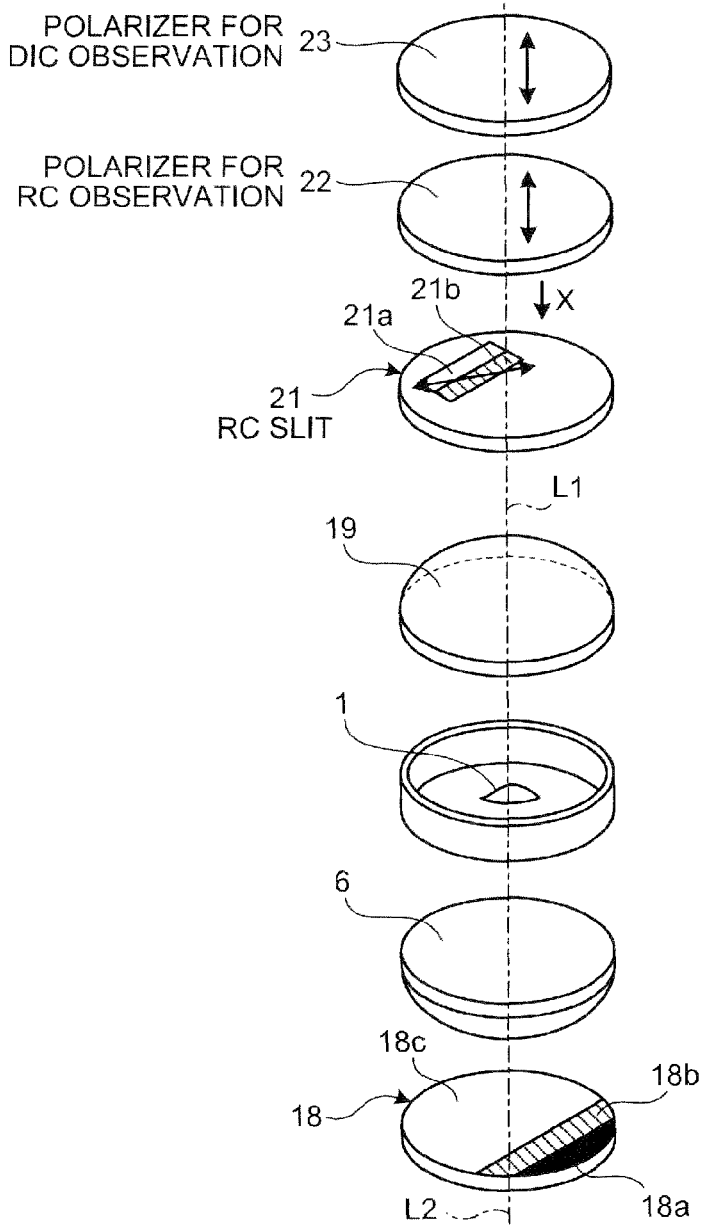
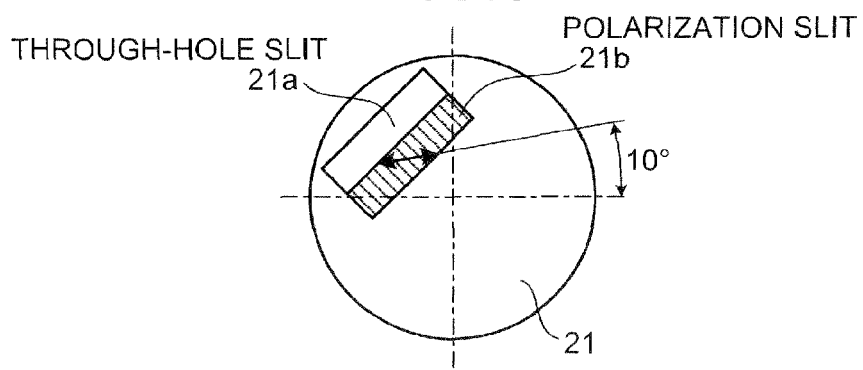

MICROSCOPE WITH SWITCHABLE CONDENSER ARRANGEMENT FOR DIFFERENT OBSERVATION METHODS

CROSS-REFERENCE TO RELATED APPLICATIONS

This application is based upon and claims the benefit of priority from Japanese Patent Application No. 2008-001674, filed Jan. 8, 2008, the entire contents of which are incorporated herein by reference.

BACKGROUND OF THE INVENTION

1. Field of the Invention

The present invention relates to a microscope in which observation methods are switchable, and specifically to a microscope in which observation methods are switchable between a relief contrast (RC) observation method and a differential interference contrast observation method or polarization observation method.

2. Description of the Related Art

Conventionally, a microscope in which observation methods are switchable in one microscope has been proposed and implemented.

Here, a conventional microscope in which observation methods are switchable will be described with reference to FIGS. 32 to 37. FIG. 32 is a schematic side view showing an overall configuration example of a conventional microscope, FIG. 33 is a schematic side view showing the extracted and enlarged condenser lens part in FIG. 32, FIG. 34 is a plan view of the RC slit part in FIG. 33 seen from the direction of the arrow X, FIG. 35 is a plan view of the slider part in FIG. 33, FIG. 36 is a plan view of the modulator shown in FIG. 32, and FIG. 37 is a plan view of the modulator shown in a positional relationship with the RC slit.

The relief contrast (RC) refers to a kind of observation methods generally called "Hoffman modulation contrast" invented by Robert Hoffman in a microscope system for phase object observation shown in Japanese Patent Application Laid-open (JP-A) No. H51-29149, for example. In addition, several kinds of observation methods based on the Hoffman modulation contrast have been invented. Further, regarding the name of the observation method, the method may be referred to as modulation contrast, IMC, LMC, RC, barrel contrast other than Hoffman modulation contrast and relief contrast. In this specification, the method is appropriately referred to as "RC observation", which is an abbreviation of relief contrast observation.

First, in the schematic side view showing an overall configuration example of a microscope 100 in FIG. 32, basic configurations of an illumination system and an observation system will be described. The illumination light output from a light source 2 illuminates a specimen 1 via an illumination system lens 3, a mirror 4, and a condenser lens 5 provided in an illumination light axis L1. The specimen 1 illuminated by the illumination light is reflected by a mirror 9 in the middle of an observation light axis L2 and projected onto a primary image surface 10 by an objective lens 6a and an imaging lens 8 on the observation light axis L2. Then, the primary image is relayed by a relay lens 11 to form a secondary image for allowing visual observation by an ocular lens 12.

At switching to an objective lens according to magnifying power and an observation method, a revolver 7 is revolved around the observation light axis L2 and a desired lens 6a is inserted into the observation light axis L2, and a focusing handle 16 is rotationally operated. Thereby, the specimen 1 is brought into focus by vertically moving a vertical movement guide 15 that holds the revolver 7 relative to a microscope main body 17 (hereinafter, sometimes referred to as an illumination optical system housing 17) for observation. Further, when an observation is desired not visually but using an image pickup device such as a CCD, an observation by electronic imaging can be made by deflecting an optical path in a direction perpendicular to the paper surface (in a direction from the front surface to the rear surface) with a prism 13 for imaging on the image pickup device such as a CCD.

Next, the condenser lens 5 will be described in detail with reference to FIGS. 33 to 35. The condenser lens 5 has a turret 24 provided near its entrance pupil location and rotating about a rotational axis 25. To the turret 24, optical devices such as a difference interference prism (hereinafter, referred to "DIC prism") 20 and an RC slit 21 for RC observation are detachably fixed. By rotating the turret 24, the optical devices can be insertably and removably positioned relative to the position on the illumination light axis L1 by a positioning mechanism such as a click mechanism (not shown). Further, in the turret 24, a lens 19 is fixedly provided in the illumination light axis L1.

The turret 24 has a centering mechanism with respect to the rotation of the RC slit 21 and the light axis in the part to which the RC slit 21 is attached as shown in FIG. 34. That is, the RC slit 21 is configured so that it may be urged to receive pressing force toward the center by a leaf spring 27 and the pressing force may be received by two screws 28 separately provided at the opposite side thereto. Thereby, the RC slit 21 can be centered with respect to the light axis through adjustment of the position of the RC slit 21 by turning the screws 28. Further, grooves 30 are provided on the periphery of the RC slit 21, and the RC slit 21 can be rotated in the horizontal plane by inserting an end of a knob 29 into one of the grooves 30 and moving the knob 29 in directions shown by an arrow in FIG. 34.

Furthermore, a slider 26 with two types of polarizing plates 22, 23 mounted thereon is provided above the turret 24. The slider 26 is slidably provided in right and left directions indicated by an arrow, and one of the two types of polarizing plates 22, 23 can be insertably and removably positioned on the illumination light axis L1 by moving the slider 26 in the arrow directions. The positioning mechanism is not particularly shown, but a general mechanism such as a click mechanism and stopper may be used. The polarizing plate 22 is a polarizer for RC observation (polarizing plate for RC observation) and the polarizing plate 23 is a polarizer for DIC observation (a polarizing plate for DIC observation). The polarizing plates 22, 23 can individually be rotated by operating peripheral parts 22a, 23a protruded to the outside, respectively, as shown in FIG. 35.

Subsequently, returning to FIG. 32, the observation system will be described. A slider 33 with a DIC prism 31 and a polarizing plate 32 overlapped in the light axis direction is provided below the revolver 7. The DIC prism 31 and the polarizing plate 32 can be insertably and removably positioned on the observation light axis L2 at the same time by moving the slider 33 in horizontal directions indicated by an arrow. The positioning mechanism is not particularly shown, but a general positioning mechanism such as a click mechanism and stopper may be used. Here, the polarizing plate 32 is an analyzer for DIC observation necessary for DIC observation. Further, the DIC prism 31 is not particularly shown, but is microscopically movable in the direction perpendicular to the light axis (horizontal direction) for contrast adjustment at DIC observation.

In such a configuration, first, the case of making DIC observation will be described. First, the revolver 7 is rotationally operated and the objective lens 6a for DIC is set on the observation light axis L2 as shown in FIG. 32. Then, before observation, adjustment is made following the procedure of (1) to (5) because it is necessary to adjust the polarizing plates in advance.

(1) rotationally operate the turret 24 in the condenser lens 5 for positioning a hole (not shown) on the illumination light axis L1 so that there is no optical device on the illumination light axis L1;

(2) slidingly operate the slider 26 in the condenser lens 5 so that the polarizer for DIC observation 23 is on the illumination light axis L1 as shown in FIG. 33;

(3) slidingly operate the slider 33 below the revolver 7 so that the prism for DIC 31 and the analyzer for DIC observation 32 are on the observation light axis L2;

(4) detach the ocular lens 12; and (5) rotationally operate the polarizer for DIC observation 23 to make a crossed Nicol condition that the vibration direction is perpendicular to the vibration direction of the analyzer for DIC observation 32. In this regard, when the exit pupil of the observation optical system is seen with the ocular lens 12 detached, diagonal lines are seen, and the crossed Nicol condition occurs when the lines are the darkest. Since the vibration direction of the analyzer for DIC observation 32 is fixed to a previously set direction, the vibration direction of the polarizer for DIC observation 23 becomes the direction indicated by an arrow 23b in FIG. 5 after the adjustment.

The above (1) to (5) are the prior crossed Nicol adjustment procedure. Regarding the crossed Nicol adjustment, if the adjustment operation is once performed, readjustment is unnecessary unless misadjustment occurs.

Then, the ocular lens 12 is attached, the IDC prism 20 adapted to the type of the objective lens 6a is inserted into the illumination light axis L1, the focus is brought on the specimen 1 as described above, and thereby, DIC observation visually or with the image pickup device such as a CCD can be made.

Next, the case of making RC observation will be described. Note that the sit adjustment before observation is also necessary in the RC observation, and here, the outline of the slit adjustment will be first described. In the RC slit 21 shown in FIG. 34, a through-hole slit 21a and a polarization slit 21b are provided side by side on a thin plate made of a material that does not transmit illumination light. The through-hole slit 21a has a rectangular strip shape that transmits 100% of light. The polarization slit 21b has a rectangular strip shape to which a polarizing plate as an analyzer for RC observation (polarizing plate for RC observation) is attached. On the other hand, the modulator 18 having a circular disc shape provided on the exit pupil location within the RC objective lens 6b necessary for RC observation in the revolver 7 is formed into three areas of areas 18a, 18b, and 18c as shown in FIG. 36. The area 18a is an area completely shielded from light, the area 18b is an area formed to have transmittance of about 25%, and the area 18c is an area with transmittance of 100%. Further, it is necessary that, by the lens 19 in the condenser lens 5 and the RC objective lens 6b, the through-hole slit 21a with transmittance of 100% be projected onto the area 18b formed to have transmittance of about 25% of the modulator 18 and the polarization slit 21b be projected onto the area 18c with transmittance of 100% without running over the areas, respectively. FIG. 37 shows the states of slit images 21a', 21b' projected onto the modulator 18 with broken lines.

In this manner, regarding the RC slit 21 and the modulator 18, relative adjustment in the two-dimensional direction perpendicular within the surface vertical to the light axis and the rotational direction around the light axis is necessary. Specifically, the adjustment is made following the procedure of (1) to (5).

(1) under the condition that the DIC objective lens 6a shown in FIG. 32 is on the observation light axis L2, rotationally operate the revolver 7 to insert the RC objective lens 6b into the illumination light axis L1;

(2) rotationally operate the turret 24 in the condenser lens 5 to insert the RC slit 21 into the illumination light axis L1;

(3) slidingly operate the slider 26 in the condenser lens 5 to insert the polarizer for RC observation 22 into the illumination light axis L1;

(4) perform centering of the RC slit 21 and rotational adjustment to project the through-hole slit 21a and the polarization slit 21b onto the areas 18b, 18c of the modulator 18 without running over the areas, respectively; and (5) adjust the contrast of the specimen 1 to be optimal by rotating the polarizer for RC observation 22 to change the transmittance of the polarization slit 21b of the RC slit 21.

Through the above (1) to (5), the prior adjustment operation before RC observation is finished. By operating the slider 33 to remove the DIC prism 31 and the analyzer for DIC observation 32 below the revolver 7 from the observation light axis L2, RC observation visually or with the image pickup device such as a CCD can be made.

Note that, since the size of the RC slit 21 varies according to types of the objective lens 6b in magnifying power, numeric aperture NA, or the like, the adjustment of (1) to (5) is necessary with respect to each type of the objective lens 6b and the RC slit 21 to be combined. Here, only one type of the objective lens 6b and the RC slit 21 are shown, but different types of objective lenses 6b and the RC slits 21 can be attached to the revolver 7 and the turret 24, and they are appropriately switched for use.

The combination of the respective objective lenses 6b and the RC slits 21 is 1:1, and thus, it is not necessary to readjust the procedure (1) to (4) after once adjusted unless misadjustment occurs due to an impact or the like. On the other hand, the adjustment of the polarizer for RC observation 22 shown in the step of (5) needs readjustment each time when the objective lens 6b is switched. This is because the objective lens 6b is screwed and fastened in the revolver 7. Thereby, not only in the case where the threaded position is not specified but also in the case where it is specified, the rotational direction of the built-in modulator 18 varies at about 5°, and the vibration direction of the analyzer of the modulator 18 also varies. Therefore, when the objective lens 6b is switched, the polarizer for RC observation 22 also needs readjustment according to the vibration direction of the analyzer of the modulator 18.

In JP-A-2003-050353, as the configuration of the condenser lens 5 is shown in FIG. 38, for example, the polarizer for DIC observation 23 and the polarizer for RC observation 22 are integrally provided on the DIC prism 20 and the RC slit 21 as optical devices to be combined, respectively. Through switching by the rotation of the turret 24, the polarizers and the optical devices in pairs can be inserted and removed into and from the illumination light axis L1 at the same time.

SUMMARY OF THE INVENTION

A microscope according to an aspect of the present invention includes a condenser lens that is provided in an illumination light path and in which at least one optical device is insertable into and removable from an illumination light axis for switching observation method; a first polarizing plate that is provided in the same light axis as the optical device and is insertable into and removable from the illumination light axis integrally with the optical device; and a second polarizing plate that is provided in the illumination light axis independently from insertion and removal of the optical device into and from the illumination light axis.

A microscope according to another aspect of the present invention includes a condenser lens that is provided in an illumination light path and in which at least one optical device is insertable into and removable from an illumination light axis for switching observation method; and a polarizing plate that is provided in the illumination light axis independently from insertion and removal of the optical device into and from the illumination light axis, commonly uses a first polarizing plate and a second polarizing plate, stores a position in a first vibration direction for the first polarizing plate and a position in a second vibration direction for the second polarizing plate, and can selectively reproduce and hold the stored positions in the first and second vibration directions.

A microscope according to still another aspect of the present invention includes a polarizing plate for differential interference or polarizing plate for polarization observation fixedly provided in an illumination light axis; and a condenser lens that is provided in an illumination light path and in which a slit for relief contrast having no polarizing plate is insertable into and removable from the illumination light axis for switching observation method.

A microscope according to still another aspect of the present invention includes a condenser lens that is provided in an illumination light path and in which a slit for relief contrast having no polarizing plate is insertable into and removable from the illumination light axis for switching observation method; and a polarizing plate for differential interference or polarizing plate for polarization observation fixedly provided in an observation light axis.

A microscope according to still another aspect of the present invention includes an eighth polarizing plate provided in an illumination light path; a condenser lens that is provided in a position different from that of the eighth polarizing plate in a light axis direction in the illumination light path and in which a slit for relief contrast is insertable into and removable from an illumination light axis for switching observation method; a ninth polarizing plate for observation different from the relief contrast observation, fixedly provided in an observation light axis; and a depolarizer provided in a position at the ninth polarizing plate side with respect to the slit for relief contrast.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a perspective view showing a device example provided in the light axis at RC observation;
FIG. 5 is a plan view of an RC slit in FIG. 4 seen from the arrow X direction.

DETAILED DESCRIPTION OF THE PREFERRED EMBODIMENTS

Figure 1:
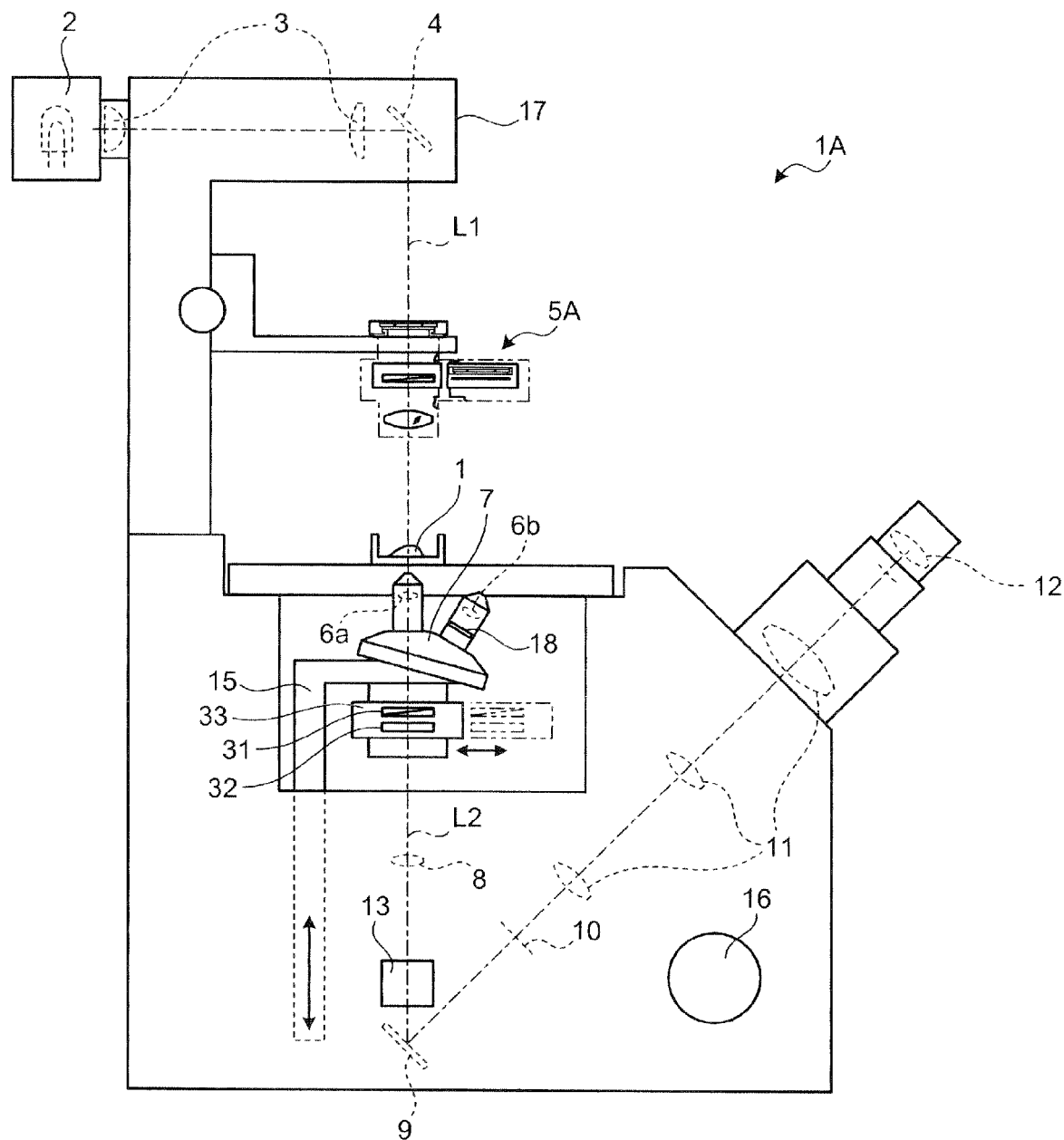
FIG. 1 is a schematic side view showing an overall configuration example of a microscope according to a first embodiment of the invention.

Exemplary embodiments of a microscope according to the invention will be described below with reference to the drawings. The parts same as or the parts corresponding to the parts shown in FIGS. 32 to 38 are shown with the same numerals and reference characters. Various changes can be made to the invention, not limited to the respective embodiments and modifications, without departing from the scope of the invention.

First Embodiment

Figure 2:
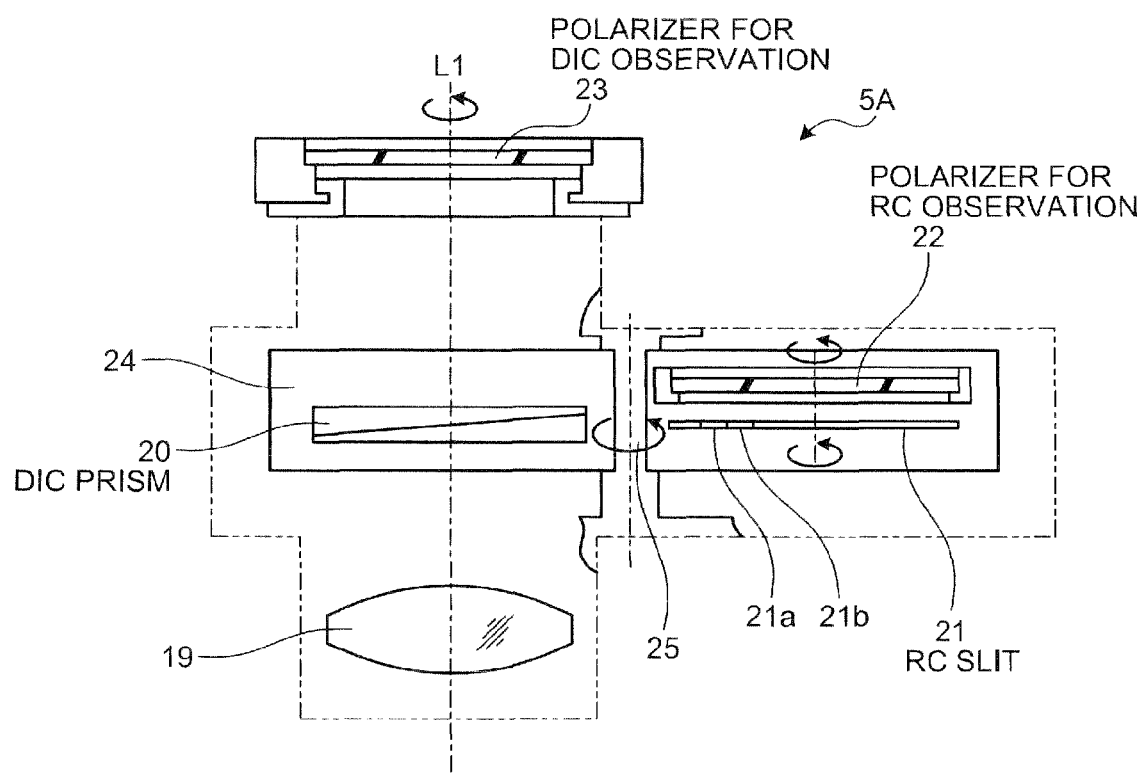
FIG. 2 is a schematic side view showing the extracted and enlarged condenser lens part in FIG. 1.
Figure 3:
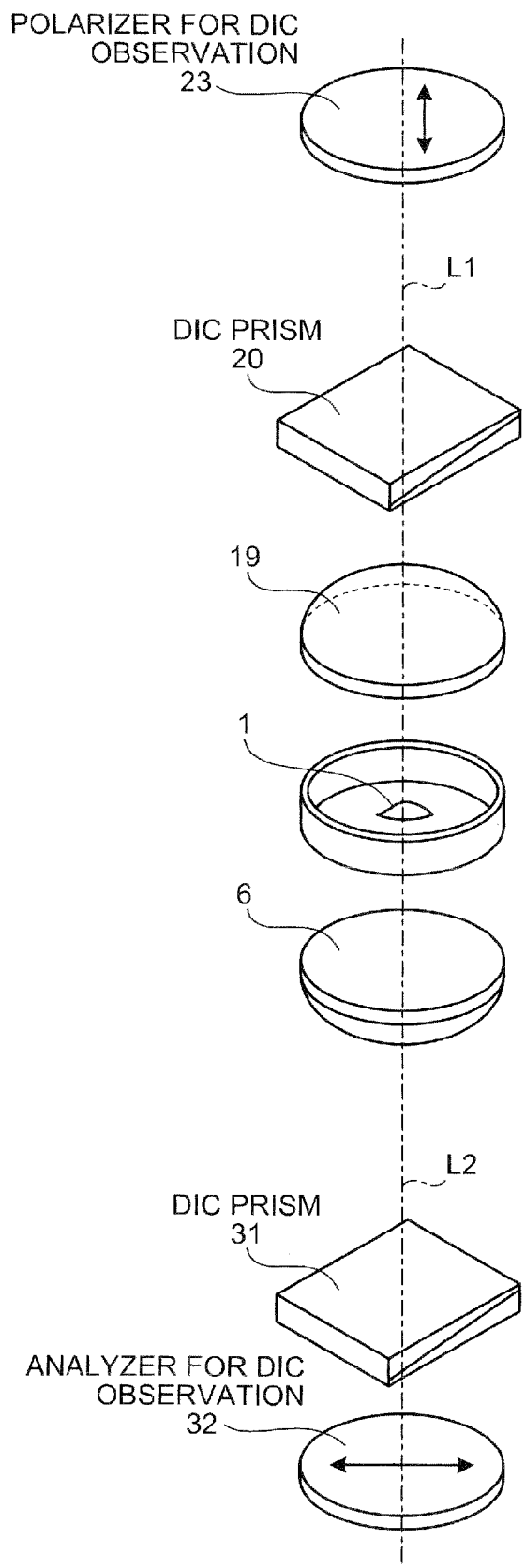
FIG. 3 is a perspective view showing a device example provided in the light axis at DIC observation.

FIG. 1 is a schematic side view showing an overall configuration example of a microscope according to a first embodiment of the invention, FIG. 2 is a schematic side view showing the extracted and enlarged condenser lens part in FIG. 1, FIG. 3 is a perspective view showing a device example provided in the light axis at DIC observation, FIG. 4 is a perspective view showing a device example provided in the light axis at RC observation, and FIG. 5 is a plan view of an RC slit in FIG. 4 seen from the arrow X direction.

Figure 32:
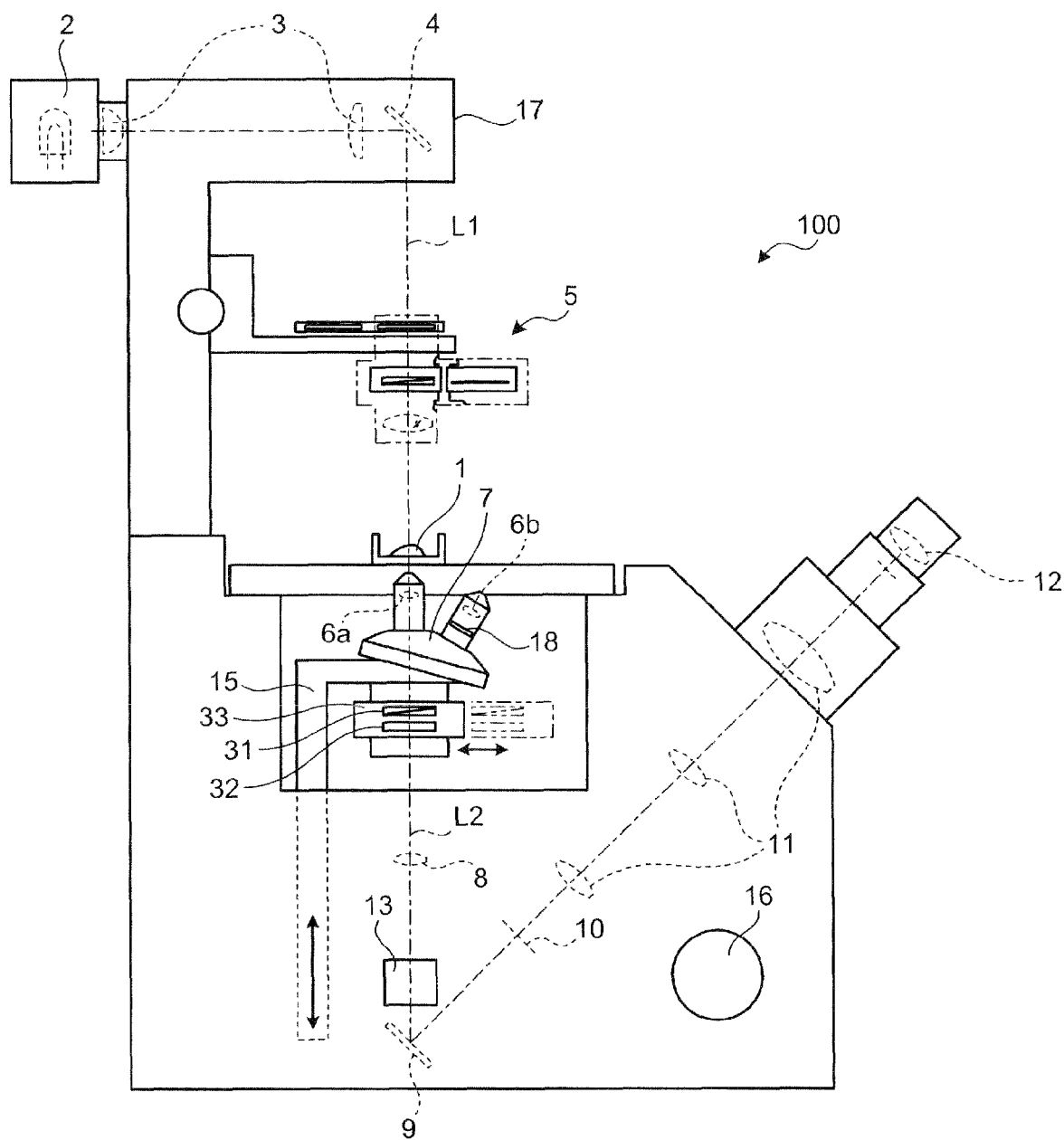
FIG. 32 is a schematic side view showing an overall configuration example of a conventional microscope.

The overall configuration of a microscope 1A according to the first embodiment shown in FIG. 1 is nearly the same as the overall configuration of the conventional microscope 100 shown in FIG. 32, but the configuration of a condenser lens 5A part is different as shown in FIG. 2. Referring to FIG. 2, the configuration of the condenser lens 5A of the first embodiment will be described. In the condenser lens 5 shown in FIG. 38, both the polarizer for RC observation 22 and the polarizer for DIC observation 23 are provided on the turret 24, and can be inserted into and removed from the illumination light axis L1 integrally with the RC slit 21 and the DIC prism 20. In the condenser lens 5A of the first embodiment, the polarizer for RC observation 22 is provided on the turret 24 to form a pair with the RC slit 21; however, the polarizer for DIC observation 23 is fixedly provided in the illumination light axis L1 above the turret 24. That is, the polarizer for RC observation 22 is provided in the same light axis as that the RC slit 21 is on, and can be inserted into and removed from the illumination light axis L1 integrally with the RC slit 21 by the turret 24. On the other hand, the polarizer for DIC observation 23 is provided in the illumination light axis L1 independently from the insertion and removal of the RC slit 21 into and from the illumination light axis L1.

Here, the polarizer for DIC observation 23 is rotatably provided for crossed Nicol adjustment as in the conventional example. Further, the structure of the turret 24 and the configuration and action of the other parts of the condenser lens 5A relating to attachment and removal of the RC slit 21, rotation adjustment, the centering adjustment mechanism, and the rotation adjustment mechanism of the polarizer for RC observation 22 are the same as those of the condenser lens 5.

According to the configuration, at DIC observation, the respective devices are provided in the light axes L1, L2 as shown in FIG. 3. Further, at RC observation, the respective devices are provided in the light axes L1, L2 as shown in FIG. 4 by rotationally operating the turret 24 and slidingly operating the slider 33.

Therefore, in the first embodiment, unlike the case of the conventional example, in the case of RC observation, not only the polarizer for RC observation 22 but also the polarizer for DIC observation 23 is inserted into the illumination light axis L1. In this case, if the vibration directions of the polarizer for RC observation 22 and the polarizer for DIC observation 23 are nearly in the perpendicular directions, a great amount of illumination light is lost. In this regard, in the first embodiment, as shown in the condition at RC observation in FIG. 4, a parallel Nicol condition that the vibration directions of the polarizer for RC observation 22 and the polarizer for DIC observation 23 are the same direction is set. Thereby, the loss of illumination light is suppressed to the minimum. Note that the expression that the vibration directions are the same direction may not mean the directions are strictly the same, but mean they are nearly the same direction.

In this regard, in the relationship in vibration direction between the polarizer for RC observation 22 and the polarization slit 21b as the analyzer for RC observation, when the total transmittance of the aperture part of the polarization slit 21b is around 20%, the contrast of the specimen 1 becomes appropriate. Here, the relative angle of the vibration directions is about 10° as shown in FIG. 5. Further, the threaded position of the objective lens 6b and the revolver 7 is specified. Thereby, if the relationship between the longitudinal direction of the polarization slit 21b of the RC slit 21 and the vibration direction of the polarization slit 21b is fixed irrespective of the type of the RC slit 21, the vibration direction of the polarization slit 21b is nearly constant irrespective of the type of the RC slit 21. Thus, as described above, both the vibration direction of the polarizer for RC observation 22 and the polarization slit 21b are adjusted at about 10° relative to the vibration direction. As a result, the vibration direction of the polarizer for RC observation 22 needs no readjustment even when the type of the RC slit 21 changes according to the magnifying power of the objective lens 6b, and can be made nearly the same as the vibration direction of the polarizer for DIC observation 23.

Note that, as shown in the condition at DIC observation in FIG. 3, the vibration direction of the analyzer for DIC observation 32 is set to provide a crossed Nicol condition according to the vibration direction of the polarizer for DIC observation 23.

According to the first embodiment, the polarizer for RC observation 22 is mounted on the turret 24 to form a pair with the RC slit 21, and inserted into and removed from the illumination light axis L1 integrally with the insertion and removal of the RC slit 21 by the rotational operation of the turret 24 that is essential when the observation method is switched. Thereby, the insertion and removal operation of the polarizer for RC observation 22 singly is not necessary and the number of times of operation when the observation method is switched can be reduced. Further, even when the magnifying power of the objective lens 6b is changed at RC observation and the RC observation and the DIC observation are switched, readjustment of the vibration directions of the polarizers 22, 23 by rotational operation is not necessary. Furthermore, the expensive polarizer for DIC observation 23 can be provided independently from the turret 24 side and configured with one element, and therefore, can be realized inexpensively. Moreover, since the vibration directions of the polarizer for DIC observation 23 and the polarizer for RC observation 22 are made the same, even when the polarizer for DIC observation 23 is present on the illumination light axis L1 at RC observation, the loss of illumination light can be suppressed to the minimum. Thereby, the polarizer for DIC observation 23 can be fixedly provided in the illumination light axis L1 without troubles, and the insertion and removal operation of the polarizer for DIC observation 23 can be made unnecessary.

First Modification

Figure 6:
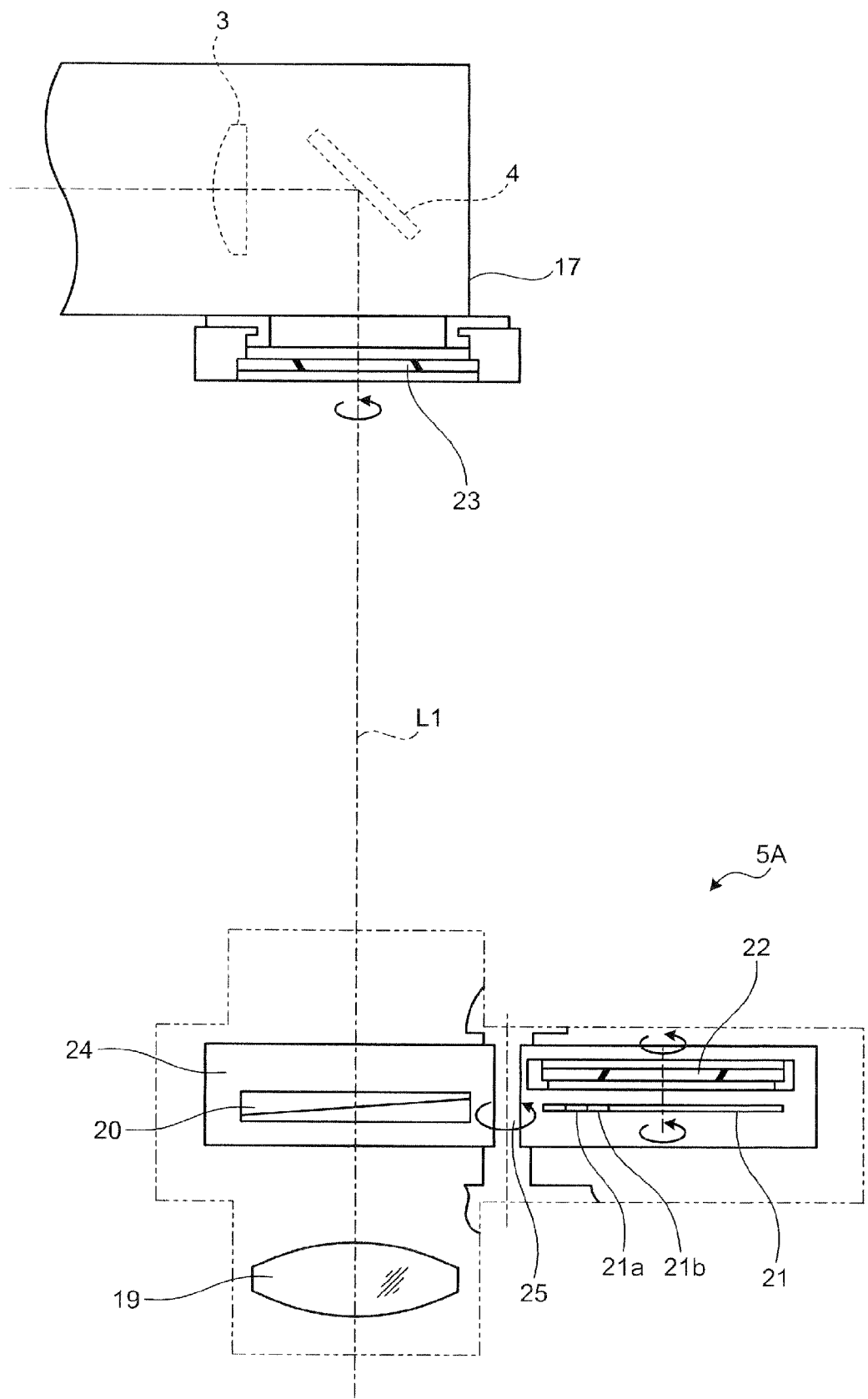
FIG. 6 is a schematic side view showing a configuration example of a part of an illumination system of a first modification according to the first embodiment.

FIG. 6 is a schematic side view showing a configuration example of a part of an illumination system of the first modification according to the first embodiment. In the first modification, the polarizer for DIC observation 23 is not provided in the condenser lens 5A part, but attached to the illumination optical system housing 17 above.

According to the first modification, if DIC observation is unnecessary, for example, the polarizer for DIC observation 23 is not necessary to be prepared and it is economical. Further, the modification is effective when there is no space for providing the polarizer for DIC observation 23 in the condenser lens 5A.

Second Modification

Figure 7:
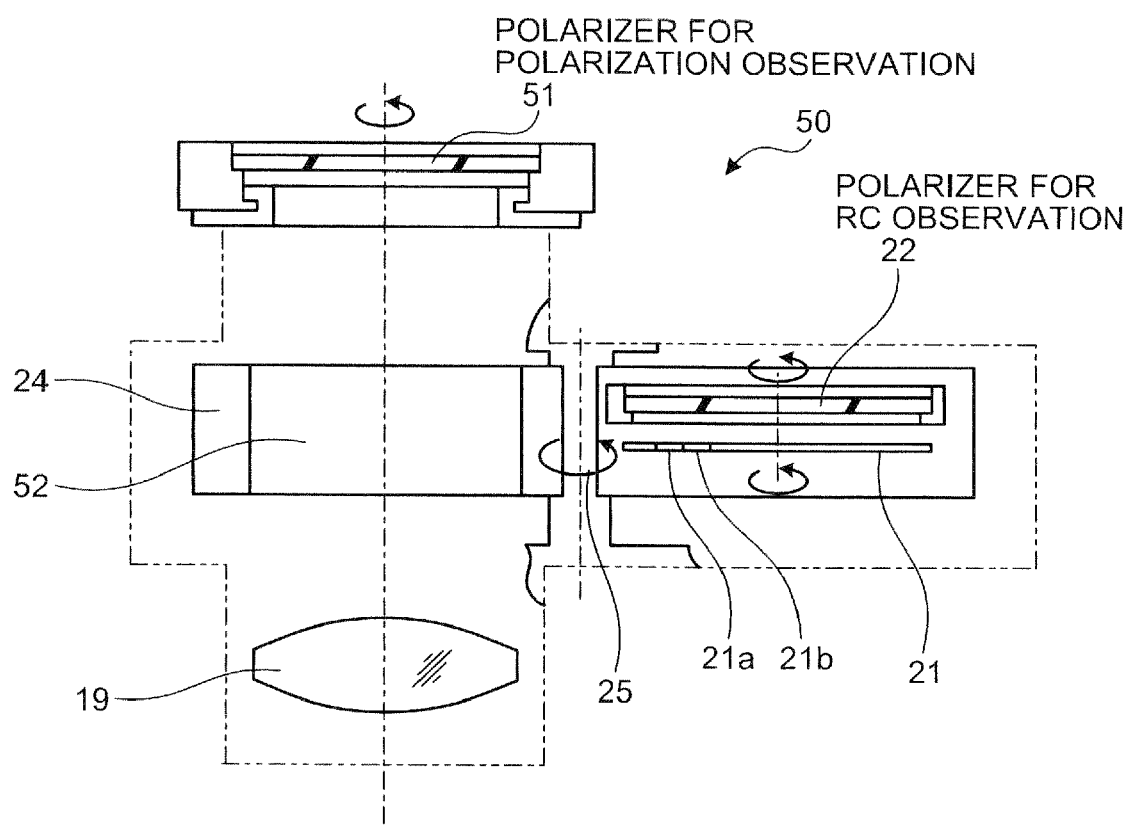
FIG. 7 is a schematic side view showing a configuration example of a condenser lens of a second modification according to the first embodiment.

FIG. 7 is a schematic side view showing a configuration example of a condenser lens 50 of a second modification according to the first embodiment. The second modification is applied to switching of the observation method between RC observation and polarization observation instead of switching of the observation method between RC observation and DIC observation. That is, in place of the polarizer for DIC observation 23 shown in FIG. 2, a polarizer for polarization observation (polarizing plate for polarization observation) 51 is provided on the condenser lens 50. Further, a through hole 52 is formed in place of the DIC prism 20 in the turret 24 on the condenser lens 50, and polarization observation can be made by the combination of the polarizer for polarization observation 51 and the through-hole 52.

Other configurations, actions, and effects are the same as those of the first embodiment. Since the polarizer for polarization observation 51 is often more expensive than the polarizer for DIC observation 23, the economical effect is much greater.

In the following embodiments, although not specifically shown, by applying the polarizer for polarization observation 51 in place of the polarizer for DIC observation 23 as in the second modification, the observation method can be switched between RC observation and polarization observation.

Second Embodiment

Figure 8:
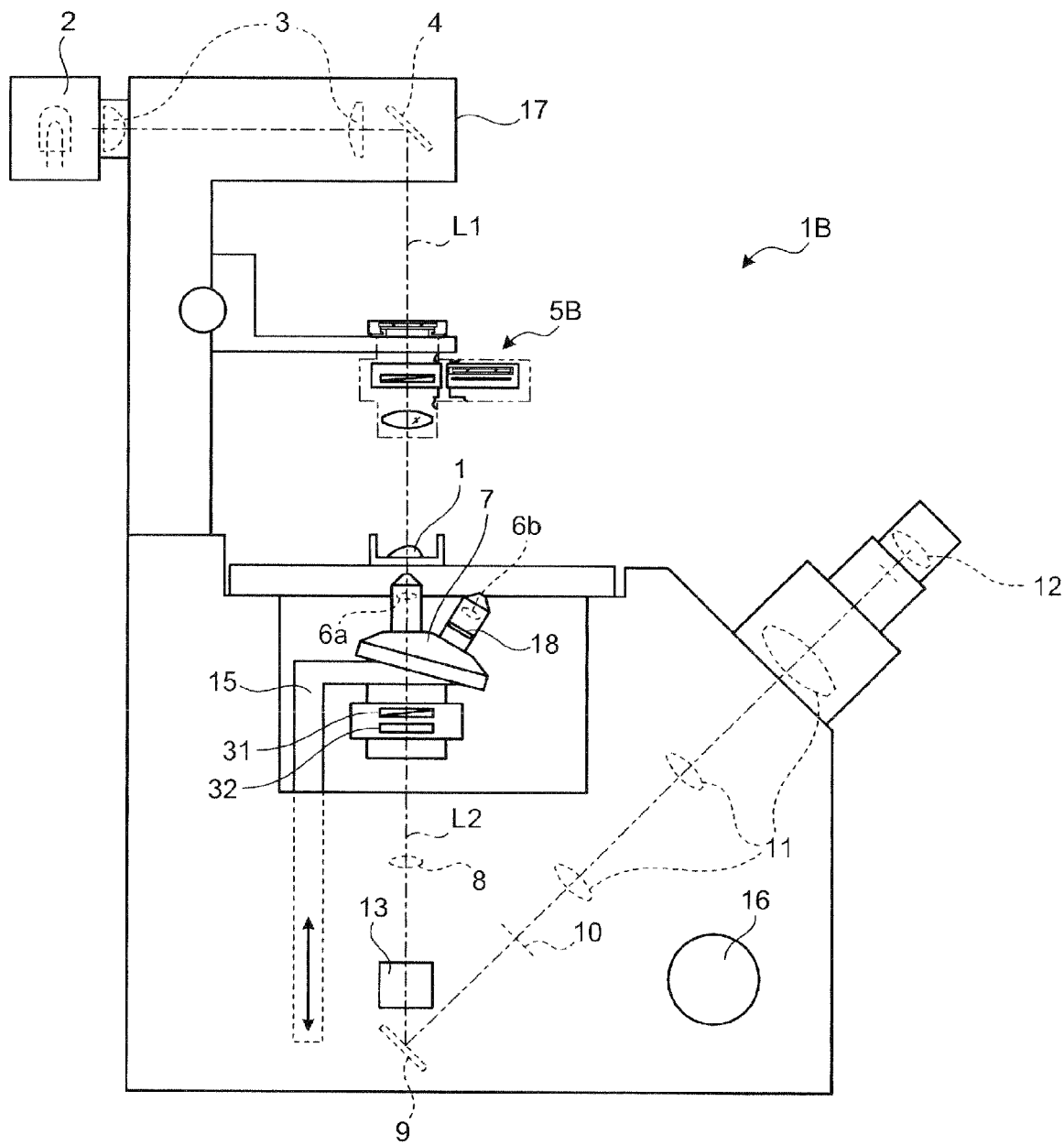
FIG. 8 is a schematic side view showing an overall configuration example of a microscope according to a second embodiment of the invention.
Figure 9:
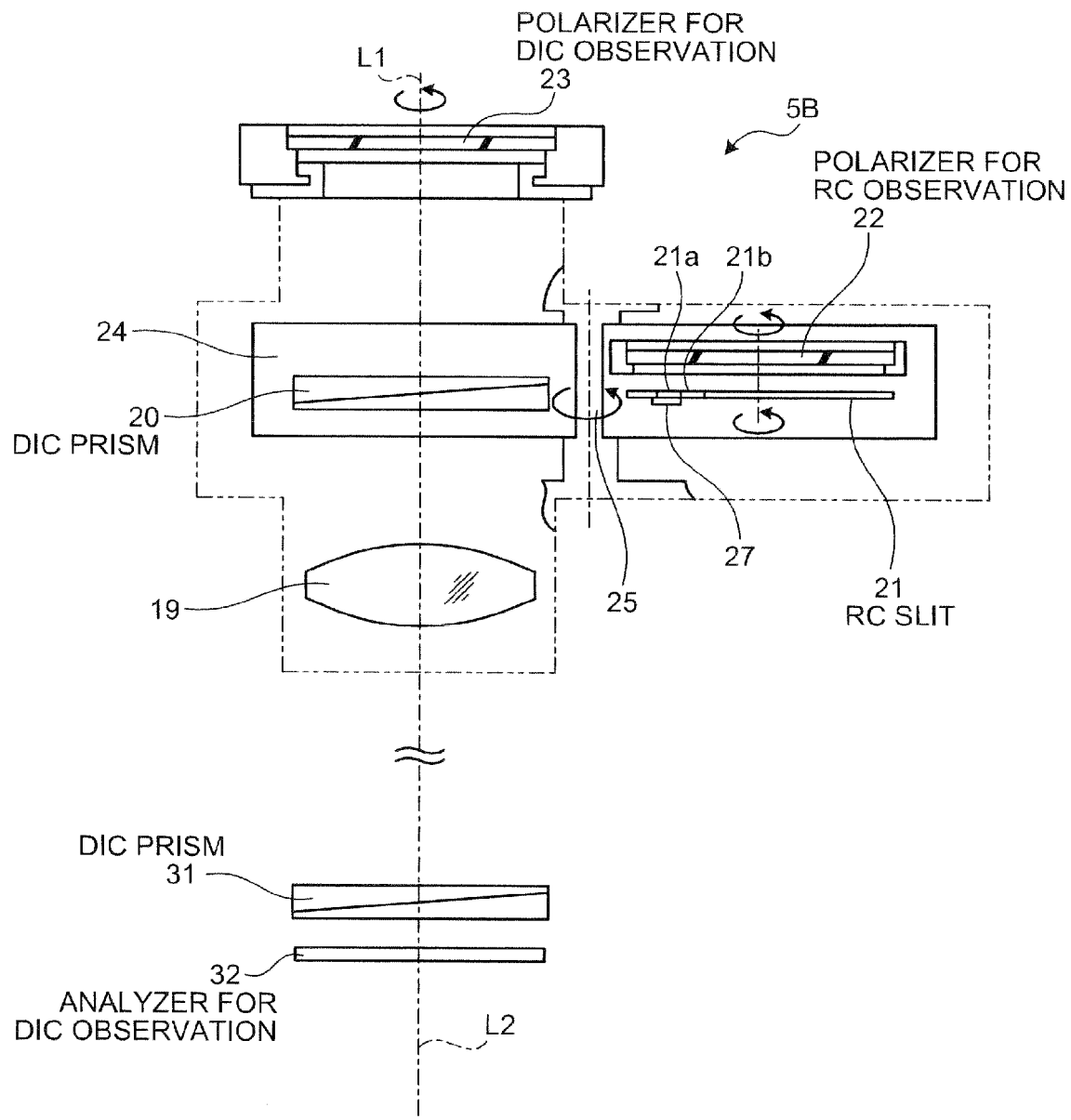
FIG. 9 is a schematic side view showing the extracted and enlarged condenser lens part in FIG. 8.
Figure 10:
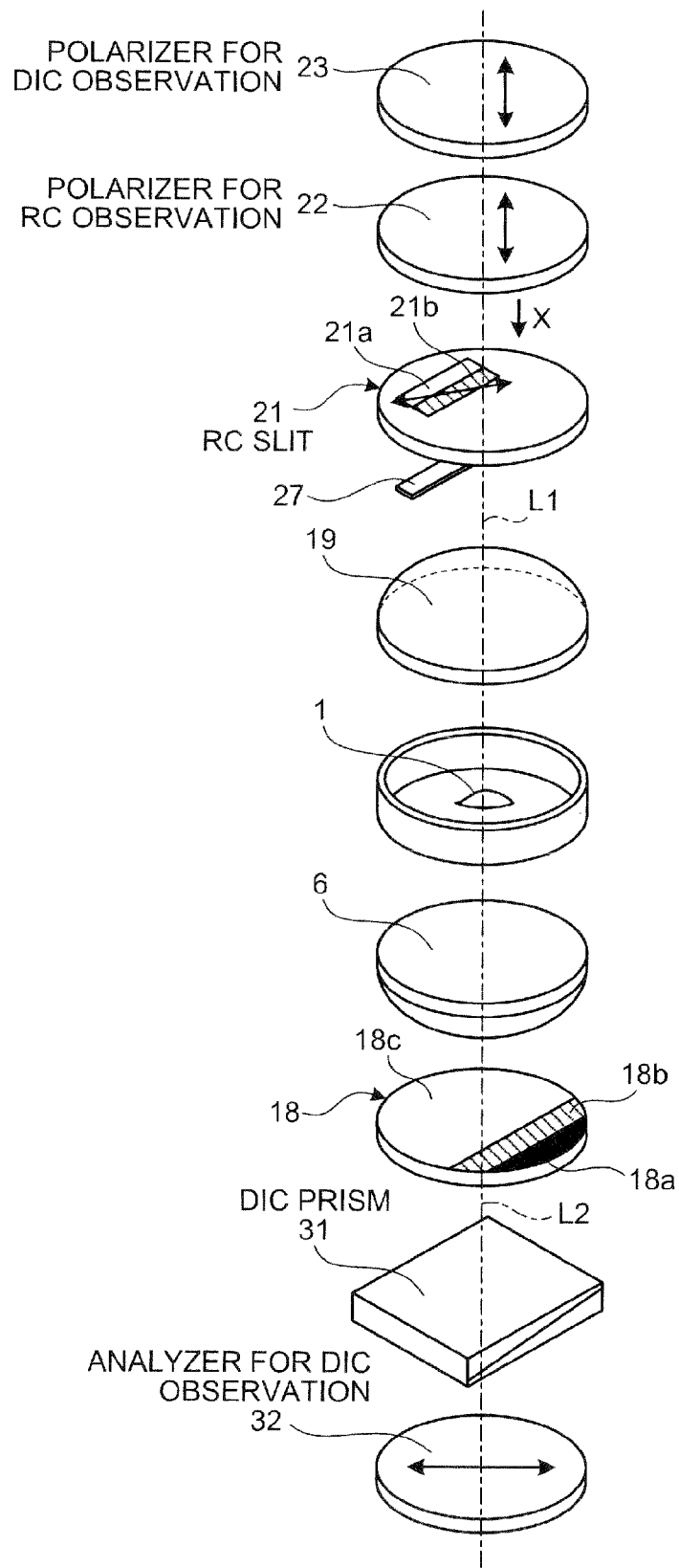
FIG. 10 is a perspective view showing a device example provided in the light axis at RC observation.

FIG. 8 is a schematic side view showing an overall configuration example of a microscope according to a second embodiment of the invention, FIG. 9 is a schematic side view showing the extracted and enlarged condenser lens part in FIG. 8, and FIG. 10 is a perspective view showing a device example provided in the light axis at RC observation.

The overall configuration of a microscope 1B according to the second embodiment shown in FIG. 8 is nearly the same as the overall configuration of the microscope 1A shown in FIG. 1, but the slider 33 is omitted with respect to the observation system and the DIC prism 31 and the analyzer for DIC observation 32 are fixedly provided in the observation light axis L2 as shown in FIG. 8. Further, in the condenser lens 5B, a depolarizer 27 is bonded and fixed to the lower surface (the observation optical system side) of the through-hole slit 21a of the RC slit 21.

According to the configuration, at DIC observation, the respective devices are provided in the light axes L1, L2 as shown in the above described FIG. 3. On the other hand, at RC observation, the respective devices are provided in the light axes L1, L2 as shown in FIG. 10 by rotationally operating the turret 24. That is, at the RC observation, the DIC prism 31 and the analyzer for DIC observation 32 also remain provided in the observation light axis L2. In this regard, the analyzer for DIC observation 32 is in a crossed Nicol condition with the vibration direction of the polarizer for RC observation 22, and the loss of the illumination light passing through the through-hole slit 21a of the RC slit 21 becomes extremely great. However, the depolarizer 27 is provided on the lower surface of the through-hole slit 21a and the polarization state of the illumination light passing through the through-hole slit 21a is resolved, and thus, the loss in the amount of light can be suppressed in the analyzer for DIC observation 32 part. Thereby, no trouble is caused when the DIC prism 31 and the analyzer for DIC observation 32 are fixedly provided in the observation light axis L2, the insertion and removal operation is unnecessary when the observation method is switched, and the number of times of the insertion and removal operation can be further reduced.

Third Embodiment

Figure 11:
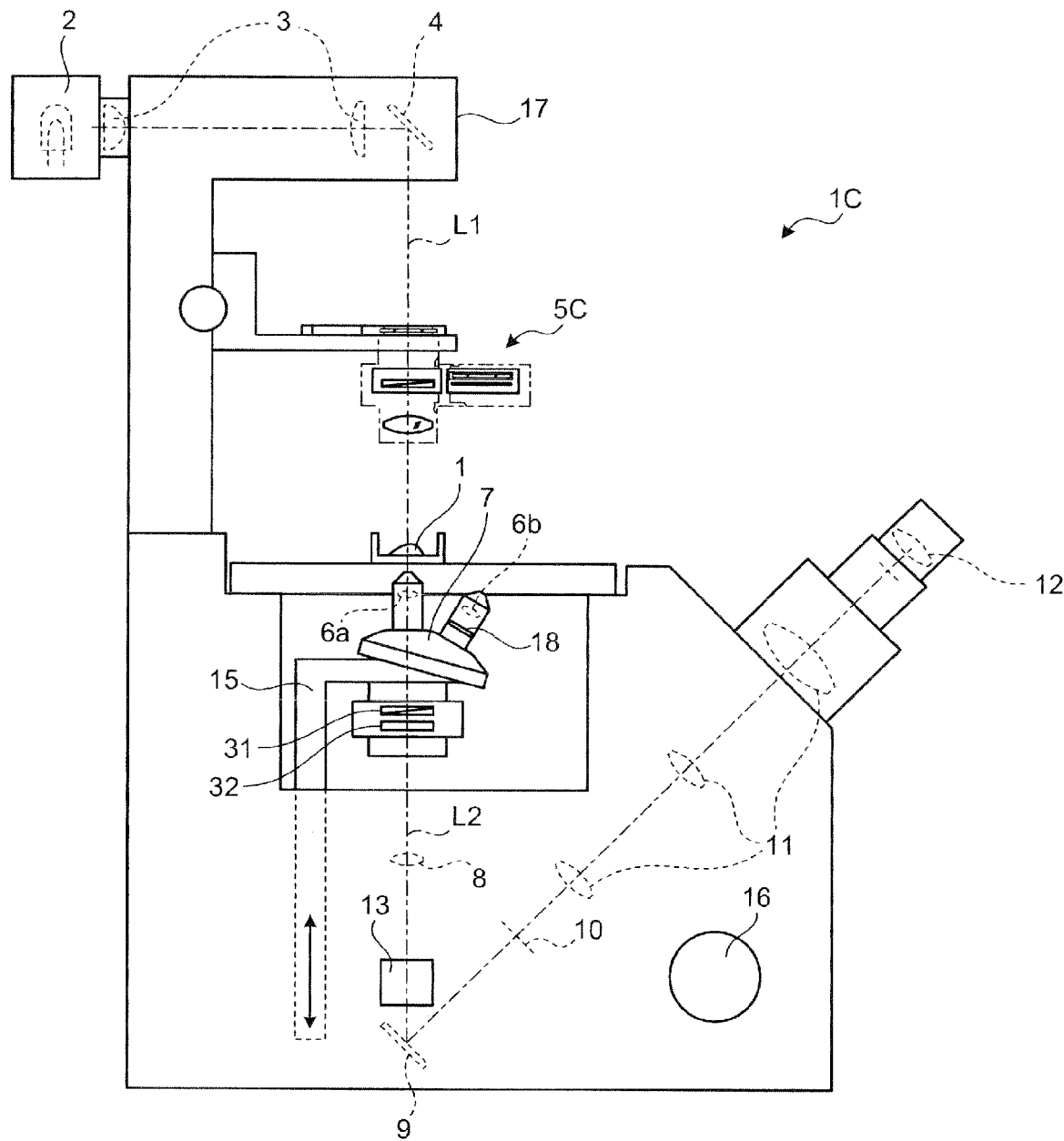
FIG. 11 is a schematic side view showing an overall configuration example of a microscope according to a third embodiment of the invention.
Figure 12:
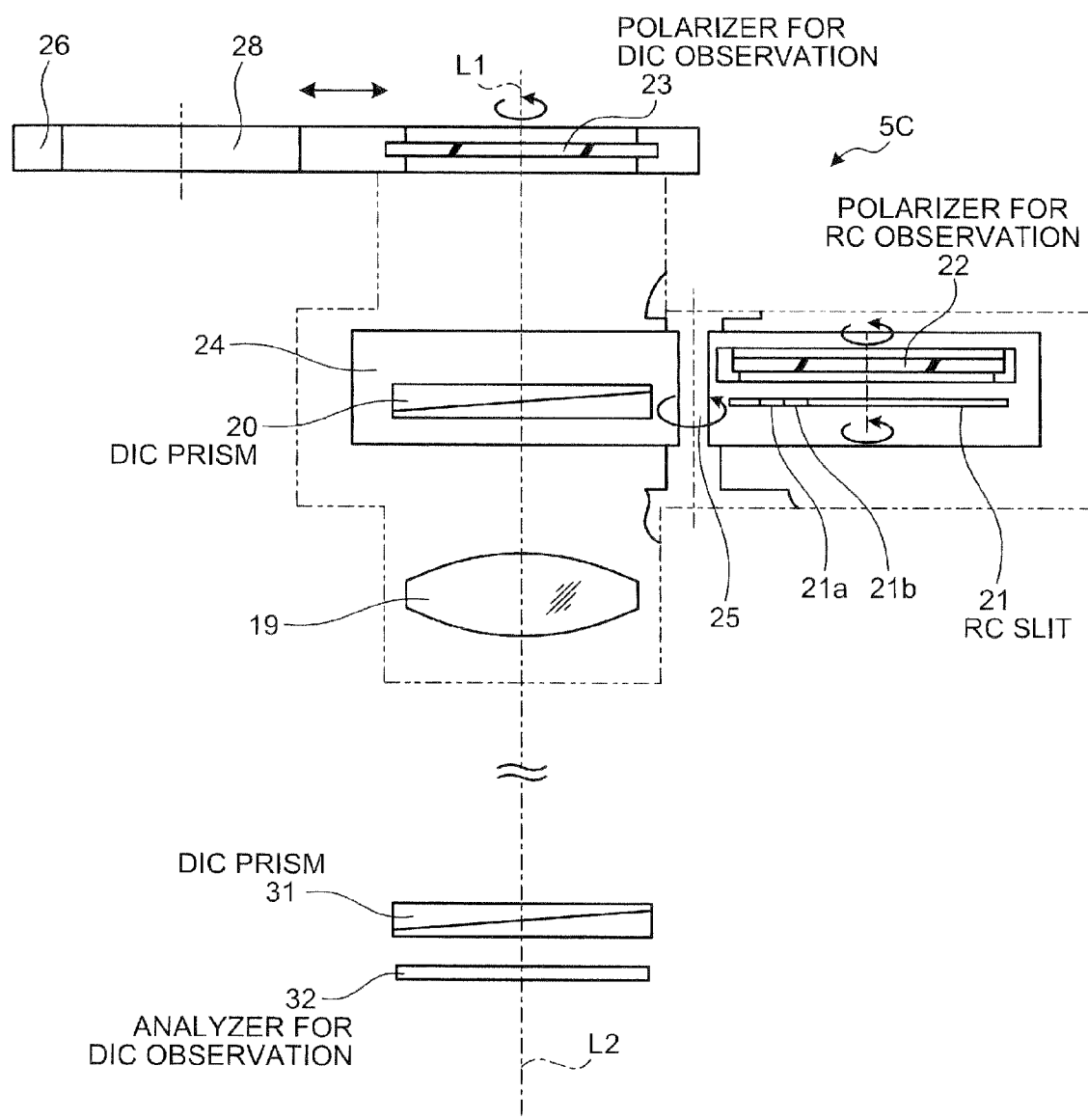
FIG. 12 is a schematic side view showing the extracted and enlarged condenser lens part and analyzer for DIC observation part in FIG. 11.
Figure 13:
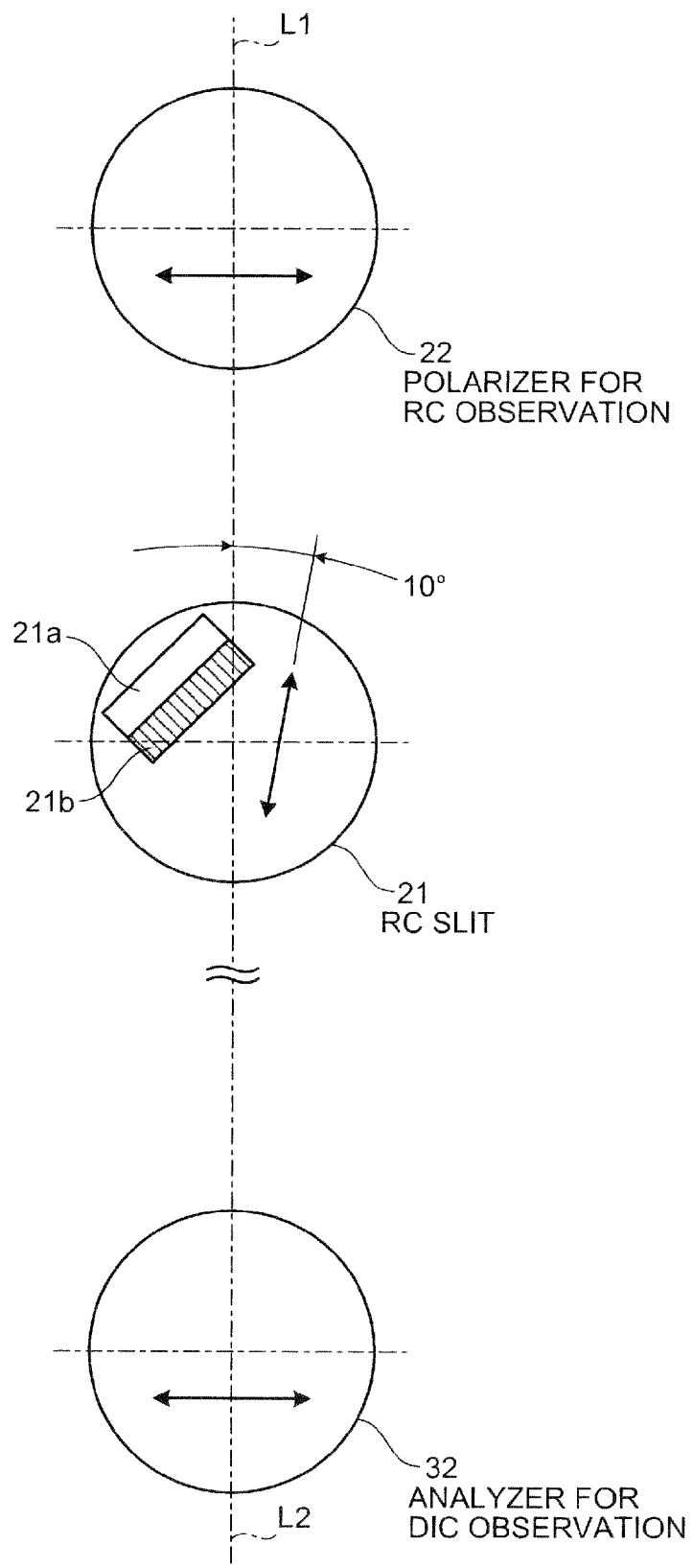
FIG. 13 is a schematic diagram showing parts of devices provided in the light axis at RC observation developed in a plane.

FIG. 11 is a schematic side view showing an overall configuration example of a microscope according to a third embodiment of the invention, FIG. 12 is a schematic side view showing the extracted and enlarged condenser lens part and analyzer for DIC observation part in FIG. 11, and FIG. 13 is a schematic diagram showing parts of devices provided in the light axis at RC observation developed in a plane.

The overall configuration of a microscope 1C according to the third embodiment shown in FIG. 11 is nearly the same as the overall configuration of the microscope 1B shown in FIG. 8, but the configuration of a condenser lens 5C part is different as shown in FIG. 12. Referring to FIG. 12, the configuration of the condenser lens 1C of the third embodiment will be described. In the third embodiment, the polarizer for DIC observation 23 is provided on the slider 26 together with a through hole 28 so that the insertion into and removal from the illumination light axis L1 can be performed independent from the turret 24 side.

In such a configuration, at RC observation, the RC slit 21 and the polarizer for RC observation 22 are inserted into the illumination light axis L1 by rotationally operating the turret 24 and the through hole 28 is inserted into the illumination light axis L1 by slidingly operating the slider 26. Thereby, the observation condition in which the polarizer for DIC observation 23 is not present on the illumination light axis L1 can be made. Thus, the loss of illumination light can be further reduced at RC observation.

Here, in the third embodiment, as in the second embodiment, the slider 33 is omitted with respect to the observation system and the DIC prism 31 and the analyzer for DIC observation 32 are fixedly provided in the observation light axis L2. Further, for DIC observation, the vibration directions of the polarizer for DIC observation 23 and the analyzer for DIC observation 32 are set in a crossed Nicol condition. In addition, in the third embodiment, as schematically shown in FIG. 13, a parallel Nicol condition that the vibration directions of the analyzer for DIC observation 32 and the polarizer for RC observation 22 are the same direction is set. Note that the expression that the vibration directions are the same direction may not mean the directions are strictly the same, but mean they are nearly the same direction. Furthermore, with the setting change of the vibration direction of the polarizer for RC observation 22, the vibration direction of the polarization slit 21b of the RC slit 21 is also adjusted and changed in settings as shown in FIG. 13 (the modulator 18 is also adjusted according thereto).

As described above, according to the third embodiment, the vibration directions of the analyzer for DIC observation 32 and the polarizer for RC observation 22 are in the parallel Nicol condition, and the loss of the illumination light passing through the through-hole slit 21a of the RC slit 21 can be suppressed to an extremely small amount. Thereby, the DIC prism 31 and the analyzer for DIC observation 32 are fixedly provided in the observation light axis L2, the insertion and removal operation can be made unnecessary when the observation method is switched, and the number of times of the insertion and removal operation can be reduced.

Fourth Embodiment

Figure 14:
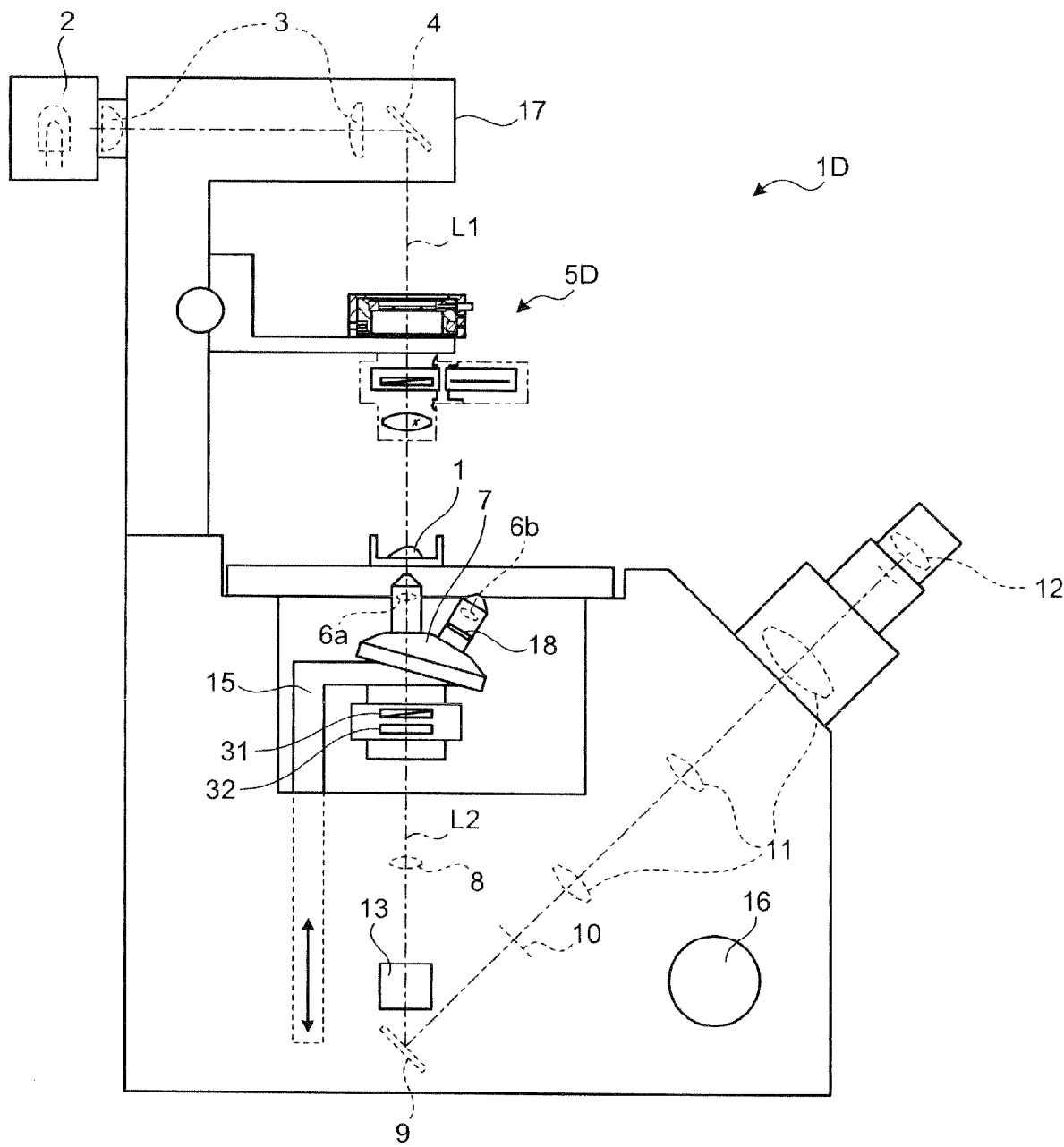
FIG. 14 is a schematic side view showing an overall configuration example of a microscope according to a fourth embodiment of the invention.
Figure 15:
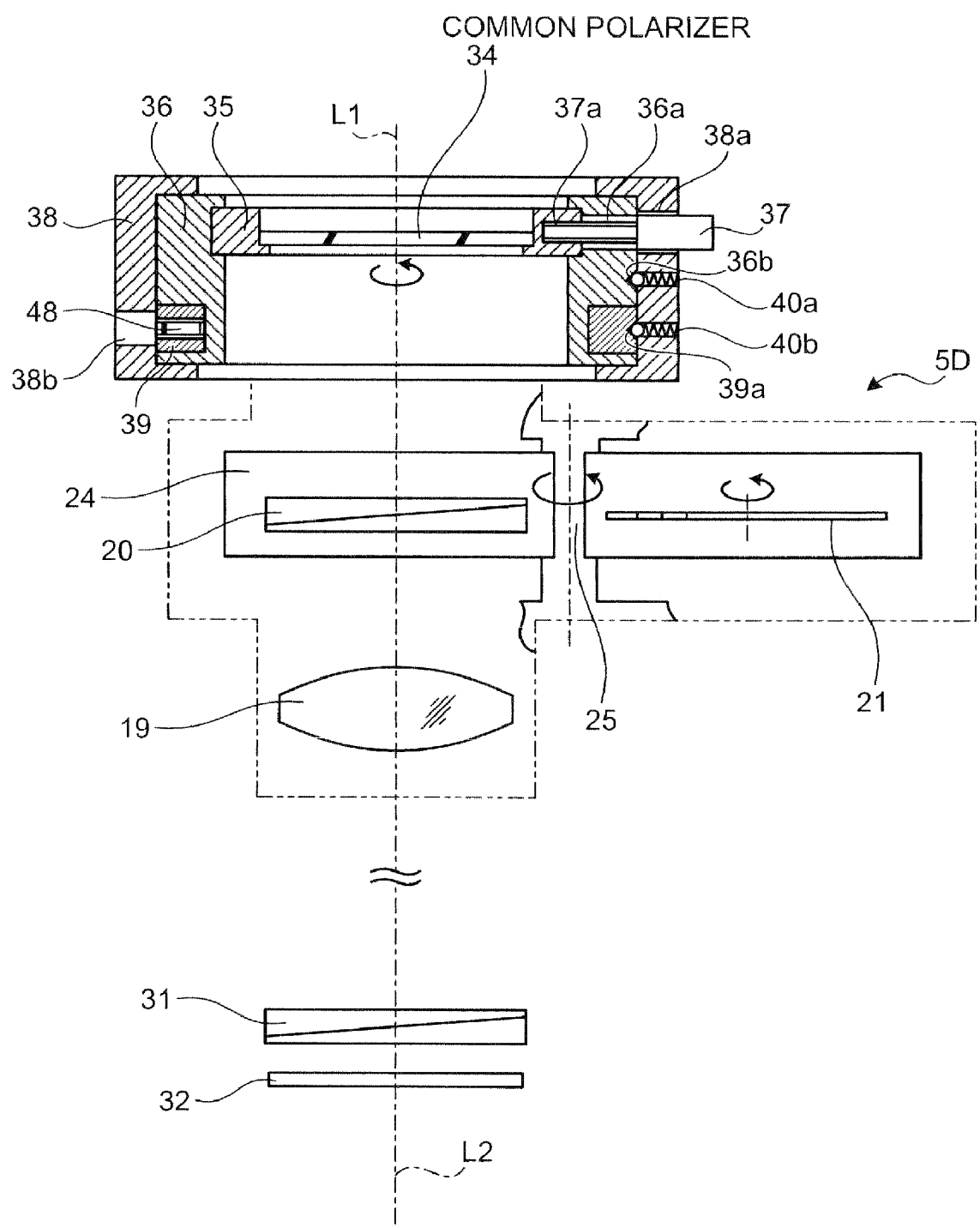
FIG. 15 is a schematic side view showing the extracted and enlarged condenser lens part and analyzer for DIC observation part in FIG. 14.
Figure 16:
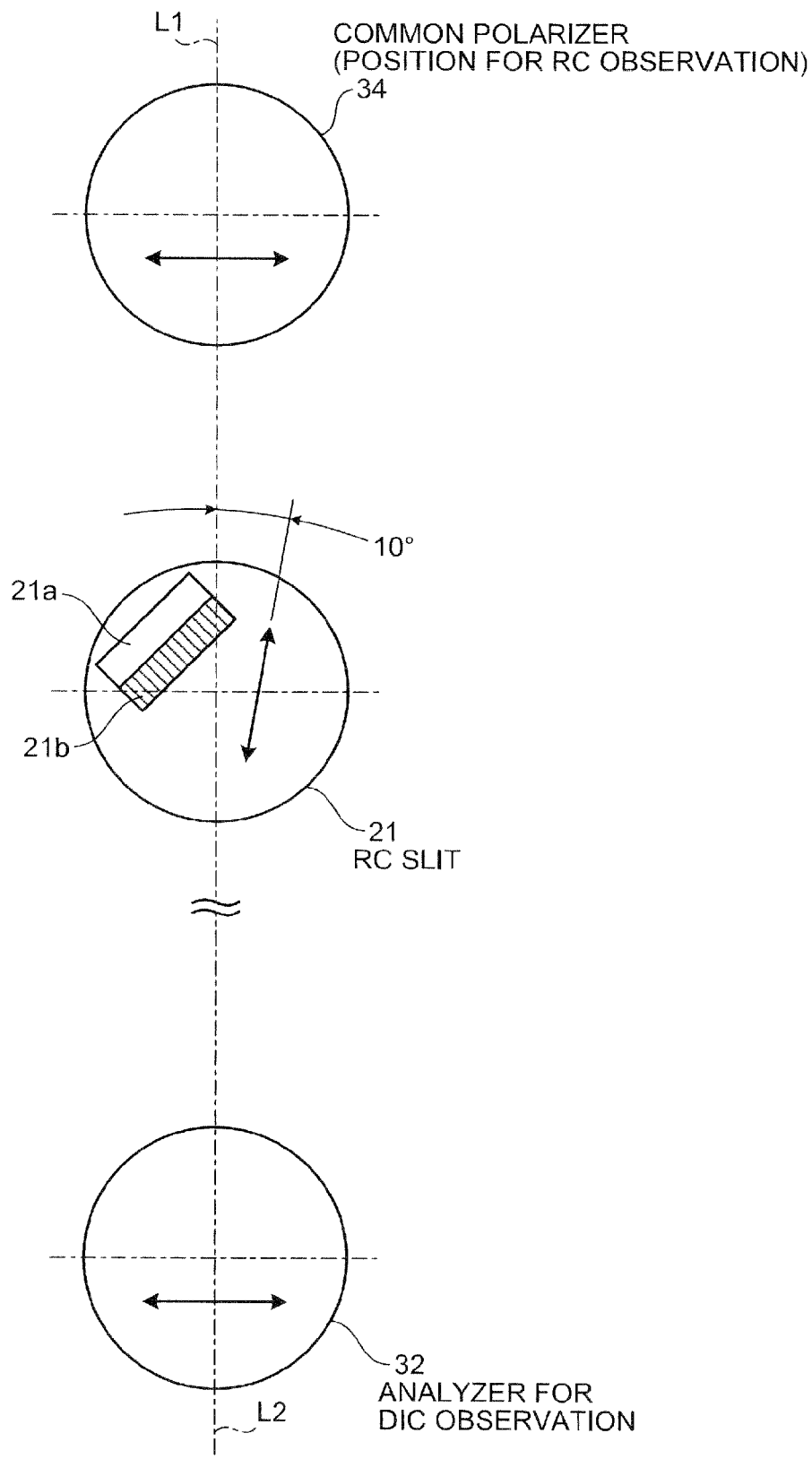
FIG. 16 is a schematic diagram showing parts of devices provided in the light axis at RC observation developed in a plane.

FIG. 14 is a schematic side view showing an overall configuration example of a microscope according to a fourth embodiment of the invention, FIG. 15 is a schematic side view showing the extracted and enlarged condenser lens part and analyzer for DIC observation part in FIG. 14, and FIG. 16 is a schematic diagram showing parts of devices provided in the light axis at RC observation developed in a plane.

The overall configuration of a microscope 1D according to the fourth embodiment shown in FIG. 14 is nearly the same as the overall configuration of the microscope 1B shown in FIG. 8, but the configuration of a condenser lens 5D part is different as shown in FIG. 15. Referring to FIG. 15, the configuration of the condenser lens 5D of the fourth embodiment will be described.

In the fourth embodiment, in the condenser lens 5D, only the DIC prism 20 and the RC slit 21 are mounted on the turret 24 and one common polarizer 34 is provided at the upper part in the position on the illumination light axis L1. The common polarizer 34 commonly uses the functions of the polarizer for DIC observation 23 and the polarizer for RC observation 22. The common polarizer 34 is configured to use a click mechanism to store the position (angle) in the first vibration direction and the position (angle) in the second vibration direction and selectively reproduce and hold the stored positions in the first and second vibration directions. Here, the first vibration direction is for the polarizer for RC observation 22, and the second vibration direction is for the polarizer for DIC observation 23.

Hereinafter, the structure for storing the positions (angles) in the first and second vibration directions of the common polarizer 34 using the click mechanism and reproducing and holding the positions will be described by referring to FIG. 15. The common polarizer 34 is bonded and secured to an annular polarizer frame 35. The polarizer frame 35 is rotatably held while its motion in the thrust direction is regulated relative to an annular middle frame 36 that is slightly larger.

Further, the middle frame 36 is rotatably held while its motion in the thrust direction is regulated relative to an annular outer frame 38 that is further slightly larger. A threaded part 37a of a knob 37 is screwed into the polarizer frame 35 via long holes 36a, 38a that are longer in the circumferential direction provided on the outer circumferential surfaces of the middle frame 36 and the outer frame 38. By moving the knob 37 while the thread is loosen, the polarizer frame 35 becomes rotatable relative to the middle frame 36. When the thread 37 of the knob is completely screwed, the polarizer frame 35 cannot rotate, but is fixed relative to the middle frame 36 in the fastened condition.

Further, if the knob 37 is moved when the thread of the knob is completely screwed, the middle frame 36 rotates relative to the outer frame 38, and can be positioned by a groove 36b formed in a part of the middle frame 36 and a click mechanism 40a including a coil spring and a ball provided in the outer frame 38. Furthermore, by a groove 39a formed in a part of an annular click frame 39 fitted at the outer circumferential surface side of the middle frame 36 and a click mechanism 40b including a coil spring and a ball provided in the outer frame 38, the click frame 39 is temporarily fixed to the outer frame 38. Thereby, if the knob 37 is moved when the thread of the knob 37 is completely screwed, the middle frame 36 rotates relative to the outer frame 38, and becomes rotatable relative to the click frame 39.

In this state, when a screw 48 screwed into the click frame 39 is fastened via a long hole 38b provided on the outer circumferential surface of the outer frame 38, the middle frame 36 and the click frame 39 integrally rotate. Further, by the groove 39a of the click frame 39 and the click mechanism 40b including the coil spring and the ball provided in the outer frame 38, the middle frame 36 and the outer frame 38 can be positioned.

According to such a configuration, crossed Nicol adjustment for DIC observation is performed with the knob 37 loosened, and the knob 37 is screwed and fastened so that the position (angle) in the vibration direction for the common polarizer 34 to function as the polarizer for DIC observation 23 may be stored. Furthermore, polarizer adjustment at RC observation is performed by rotationally operating the knob 37, and the screw 48 is fastened so that the position (angle) in the vibration direction for the common polarizer 34 to function as the polarizer for RC observation 22 may be stored.

Accordingly, at DIC observation and RC observation, regarding the common polarizer 34, the position of crossed Nicol for DIC observation and the position in the vibration direction of the polarizer for RC observation can be selectively reproduced and held by rotationally operating the knob 37 with the click mechanisms 40a or 40b.

Thus, according to the fourth embodiment, when the observation method is switched, the positions in two vibration directions set in the common polarizer 34 may be selectively reproduced and held, and the insertion and removal operation into the illumination light axis L1 is unnecessary and the number of times of the insertion and removal operation can be reduced. Further, the positions in two vibration directions set in the common polarizer 34 are reproducibly and holdably stored using the click mechanisms 40a, 40b, and switching of the vibration direction of the common polarizer 34 when the observation method is switched can be easily performed. In addition, DIC observation and RC observation can be made with one common polarizer 34, and the configuration can be inexpensively made.

Here, in the fourth embodiment, as in the third embodiment, the slider 33 is omitted with respect to the observation system and the DIC prism 31 and the analyzer for DIC observation 32 are fixedly provided in the observation light axis L2. Further, for DIC observation, the position in the vibration direction in which the common polarizer 34 functions as the polarizer for DIC observation 23 and the position in the vibration direction of the analyzer for DIC observation 32 are set in a crossed Nicol condition. Furthermore, as schematically shown in FIG. 16, a parallel Nicol condition that the position in the vibration direction of the analyzer for DIC observation 32 and the position in the vibration direction in which the common polarizer 34 functions as the polarizer for RC observation 22 are in the same direction is set. Note that the expression that the vibration directions are the same direction may not mean the directions are strictly the same, but mean they are nearly the same direction. Furthermore, with the setting change of the vibration direction of the polarizer for RC observation 22, the vibration direction of the polarization slit 21b of the RC slit 21 is also adjusted and changed in settings as shown in FIG. 13 (the modulator 18 is also adjusted according thereto).

As described above, according to the fourth embodiment, the position in the vibration direction of the analyzer for DIC observation 32 and the position in the vibration direction in which the common polarizer 34 functions as the polarizer for RC observation 22 are in the parallel Nicol condition. Accordingly, the loss of the illumination light passing through the through-hole slit 21a of the RC slit 21 can be suppressed to an extremely small amount. Thereby, the DIC prism 31 and the analyzer for DIC observation 32 are fixedly provided in the observation light axis L2, the insertion and removal operation can be made unnecessary when the observation method is switched, and the number of times of the insertion and removal operation can be reduced.

Fifth Embodiment

Figure 17:
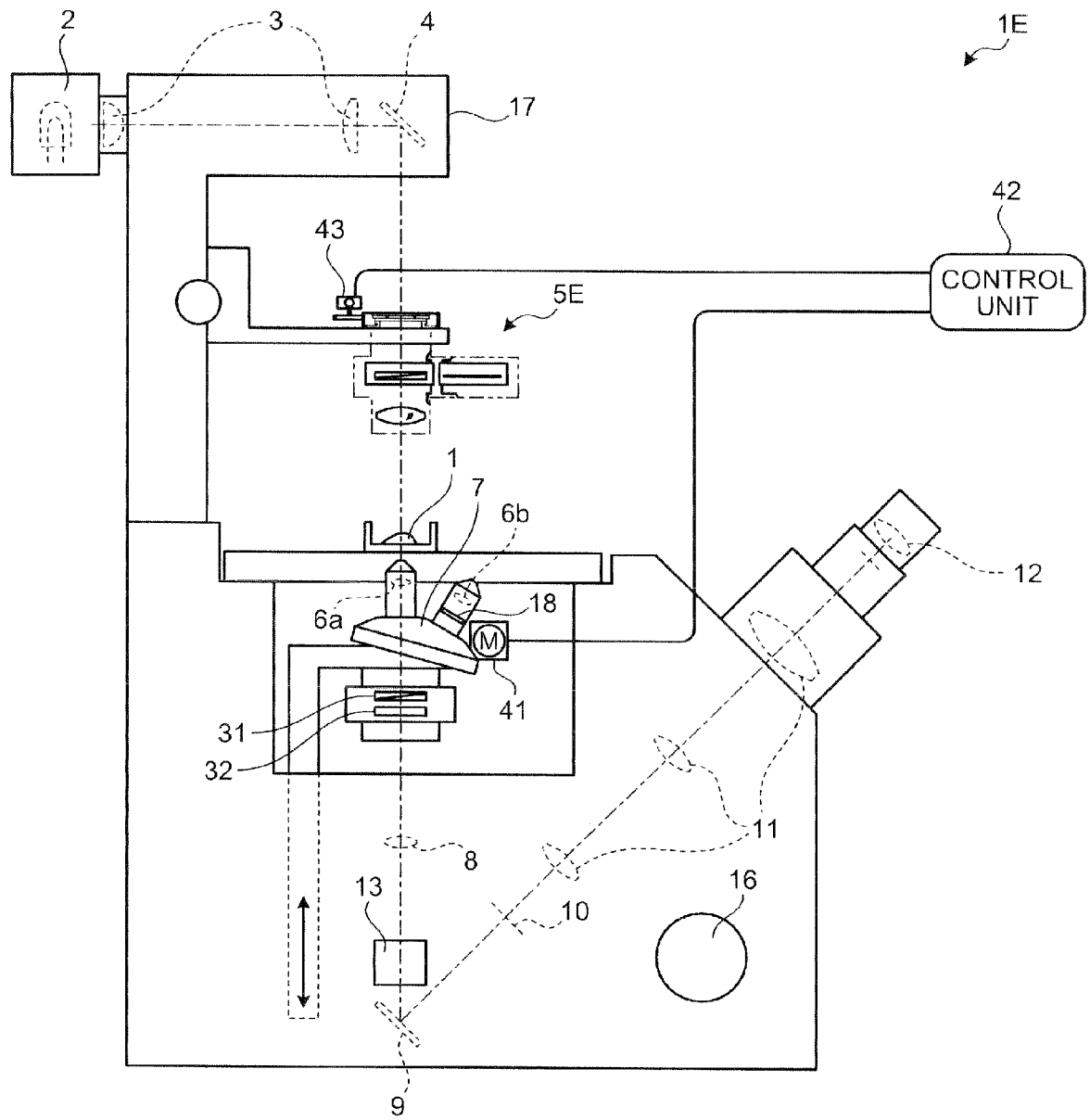
FIG. 17 is a schematic side view showing an overall configuration example of a microscope according to a fifth embodiment of the invention.
Figure 18:
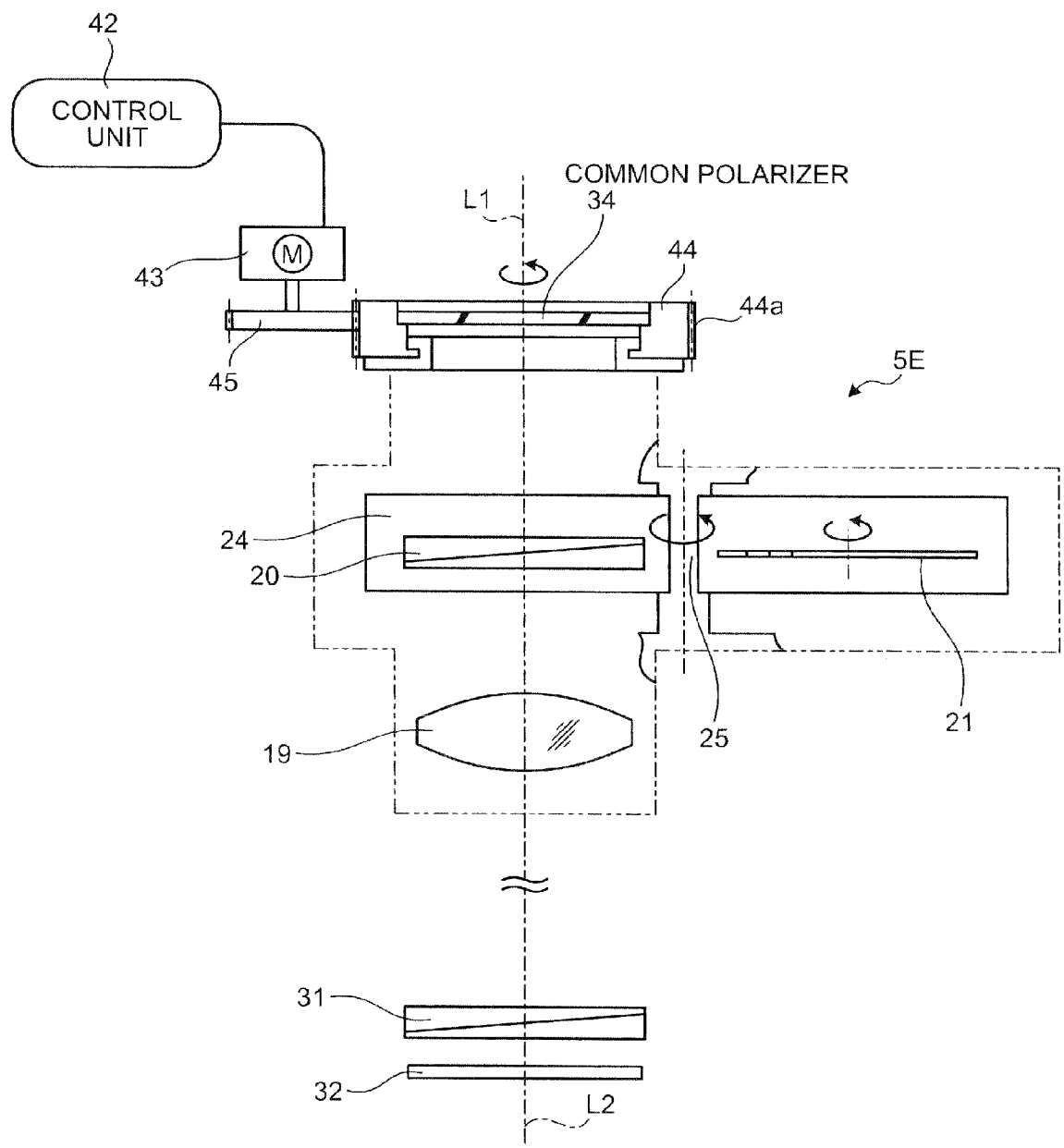
FIG. 18 is a schematic side view showing the extracted and enlarged condenser lens part and analyzer for DIC observation part in FIG. 17.
Figure 19:
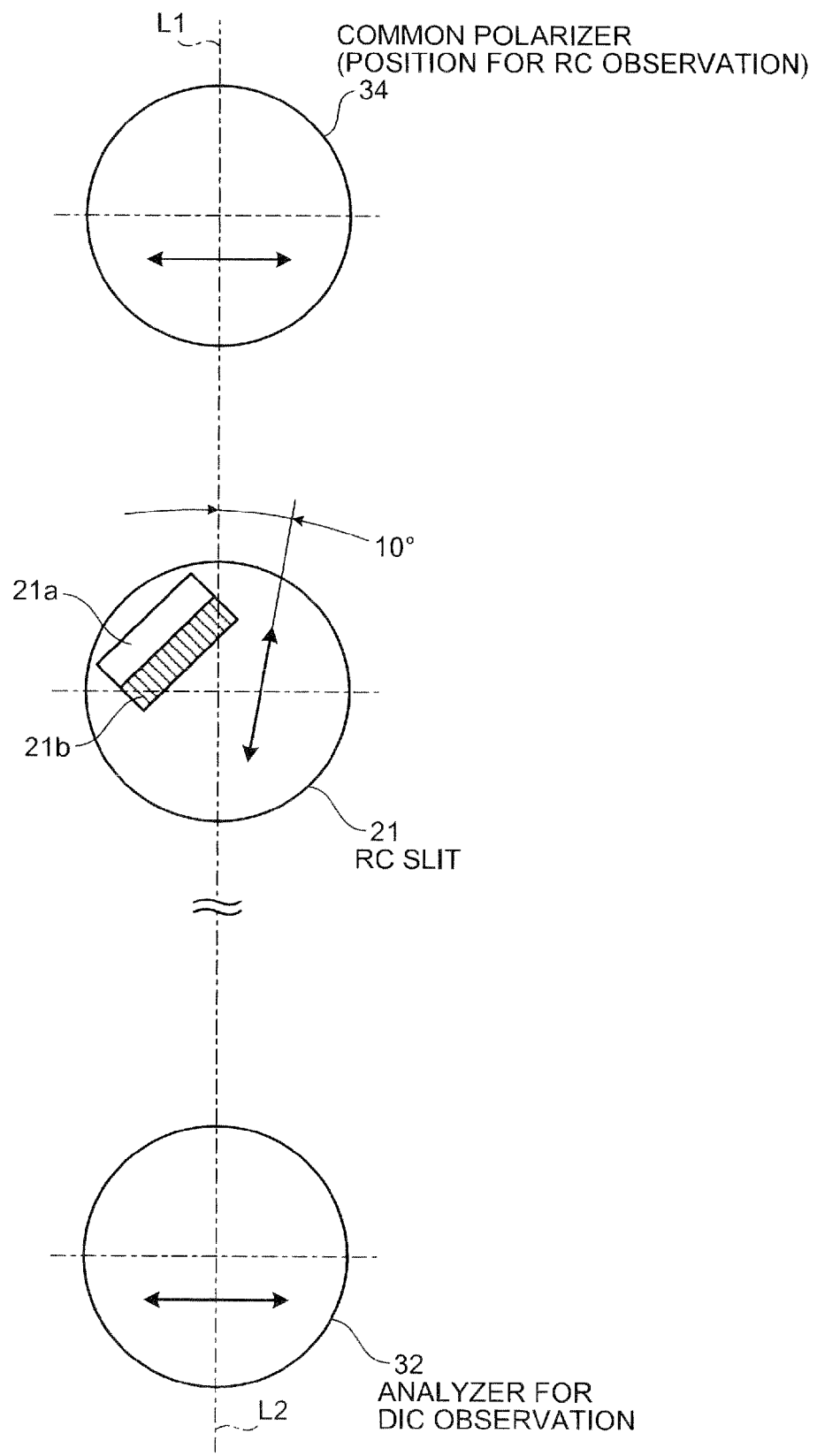
FIG. 19 is a schematic diagram showing parts of devices provided in the light axis at RC observation developed in a plane.

FIG. 17 is a schematic side view showing an overall configuration example of a microscope according to a fifth embodiment of the invention, FIG. 18 is a schematic side view showing the extracted and enlarged condenser lens part and analyzer for DIC observation part in FIG. 17, and FIG. 19 is a schematic diagram showing parts of devices provided in the light axis at RC observation developed in a plane.

The overall configuration of a microscope 1E according to the fifth embodiment shown in FIG. 17 is nearly the same as the overall configuration of the microscope 1D shown in FIG. 14, but the configuration of a condenser lens 1E part is different as shown in FIG. 18. Referring to FIG. 18, the configuration of the condenser lens 5E of the fifth embodiment will be described.

In the fifth embodiment, in the condenser lens 5E, only the DIC prism 20 and the RC slit 21 are mounted on the turret 24 and one common polarizer 34 is provided at the upper part in the position on the illumination light axis L1. The common polarizer 34 commonly uses the functions of the polarizer for DIC observation 23 and the polarizer for RC observation 22. The common polarizer 34 is configured, under the electric control using a motor 43, to automatically store the position (angle) in the first vibration direction and the position (angle) in the second vibration direction and selectively reproduce and hold the stored positions in the first and second vibration directions. Here, the first vibration direction is for the polarizer for RC observation 22, and the second vibration direction is for the polarizer for DIC observation 23.

Hereinafter, the configuration for storing the positions (angles) of the first and second vibration directions of the common polarizer 34 under the electric control using a motor 43 and reproducing and holding the positions will be described by referring to FIG. 18. First, the common polarizer 34 is bonded and secured to an annular polarizer frame 44 that is rotatably provided. A gear 44a is provided on the outer circumferential surface of the polarizer frame 44, meshed with a gear 45 fixed to the shaft of the motor 43, and the polarizer frame 44 is rotatable by the rotational drive of the motor 43. Here, the motor 43 includes a rotational angle detection mechanism of a rotary encoder or the like, and the rotational angle can be detected. Further, a control unit 42 for controlling the drive of the motor 43 stores each position (angle) in the vibration direction adjusted and set so that the common polarizer 34 as described in the fourth embodiment may function as the polarizer for DIC observation or the polarizer for RC observation. In addition, as shown in FIG. 17, the revolver 7 is also configured rotatable by the motor 41. The operation of the motor 41 is also controlled by the control unit 42.

Thereby, the control unit 42 determines what type of objective lens is inserted into the observation light axis L2 based on the drive of the motor 41. Then, the control unit 42 automatically reproduces and holds the position (angle) in the vibration direction of the common polarizer 34 that has been properly set in advance through the drive-control by the motor 43 according to the type of inserted objective lens.

According to such a configuration, in the fifth embodiment, when the objective lens is switched, the common polarizer 34 is reproduced and held by the motor 43 to be in the proper position (angle) in the vibration direction concurrently with the switching. Thus, observation according to a desired observation method can be made only by rotational operation of the turret 24 that is essential for the switching of the observation method to insert the DIC prism 20 and the RC slit 21 that are adapted to the magnifying power of the objective lens and the observation method into the illumination light axis L1.

Therefore, according to the fifth embodiment, when the observation method is switched, the positions in two vibration directions set in the common polarizer 34 may be selectively reproduced and held, and the insertion and removal operation of the common polarizer 34 into the illumination light axis L1 is unnecessary and the number of times of the insertion and removal operation can be reduced. Further, also the rotational operation of the common polarizer 34 can be automatically conducted by the motor 43, and no manual operation for the common polarizer 34 is necessary. Furthermore, DIC observation and RC observation can be made with one common polarizer 34, and the configuration can be inexpensively made.

Here, in the fifth embodiment, as in the fourth embodiment, the slider 33 is omitted with respect to the observation system and the DIC prism 31 and the analyzer for DIC observation 32 are fixedly provided in the observation light axis L2. Further, for DIC observation, the position in the vibration direction in which the common polarizer 34 functions as the polarizer for DIC observation 23 and the position in the vibration direction of the analyzer for DIC observation 32 are set in a crossed Nicol condition. Furthermore, as schematically shown in FIG. 19, a parallel Nicol condition that the position in the vibration direction of the analyzer for DIC observation 32 and the position in the vibration direction in which the common polarizer 34 functions as the polarizer for RC observation 22 are in the same direction is set. Note that the expression that the vibration directions are the same direction may not mean the directions are strictly the same, but mean they are nearly the same direction. Furthermore, with the setting change of the vibration direction of the polarizer for RC observation 22, the vibration direction of the polarization slit 21b of the RC slit 21 is also adjusted and changed in settings as shown in FIG. 19 (the modulator 18 is also adjusted according thereto).

As described above, according to the fifth embodiment, the position in the vibration direction of the analyzer for DIC observation 32 and the position in the vibration direction in which the common polarizer 34 functions as the polarizer for RC observation 22 are in the parallel Nicol condition. Accordingly, the loss of the illumination light passing through the through-hole slit 21a of the RC slit 21 can be suppressed to an extremely small amount. Thereby, the DIC prism 31 and the analyzer for DIC observation 32 are fixedly provided in the observation light axis L2, and the insertion and removal operation is unnecessary when the observation method is switched. Accordingly, the necessary insertion and removal operation by an operator is only the rotational operation of the turret 24 that is essential for the switching of the observation method.

Sixth Embodiment

Figure 20:
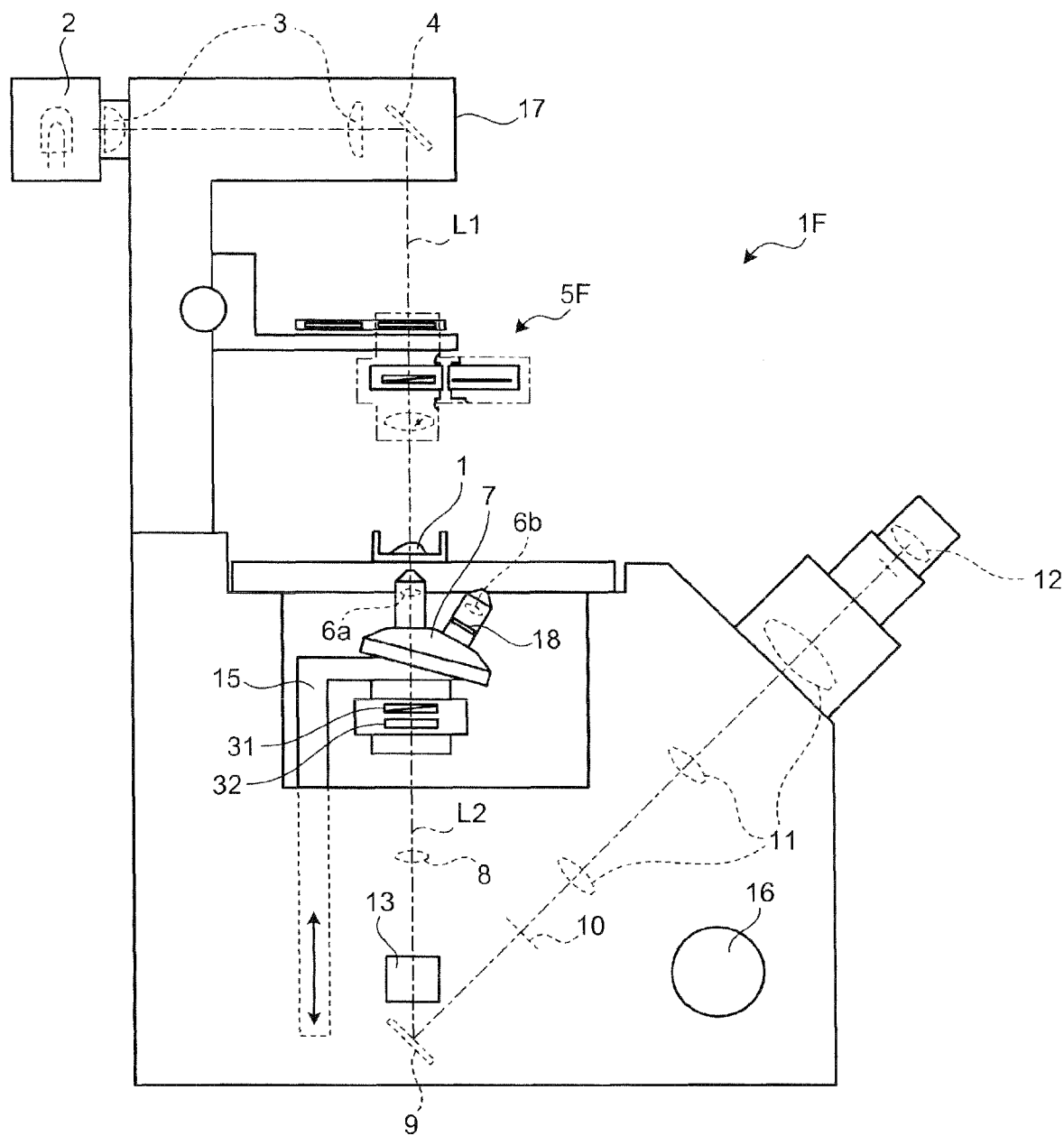
FIG. 20 is a schematic side view showing an overall configuration example of a microscope according to a sixth embodiment of the invention.
Figure 21:
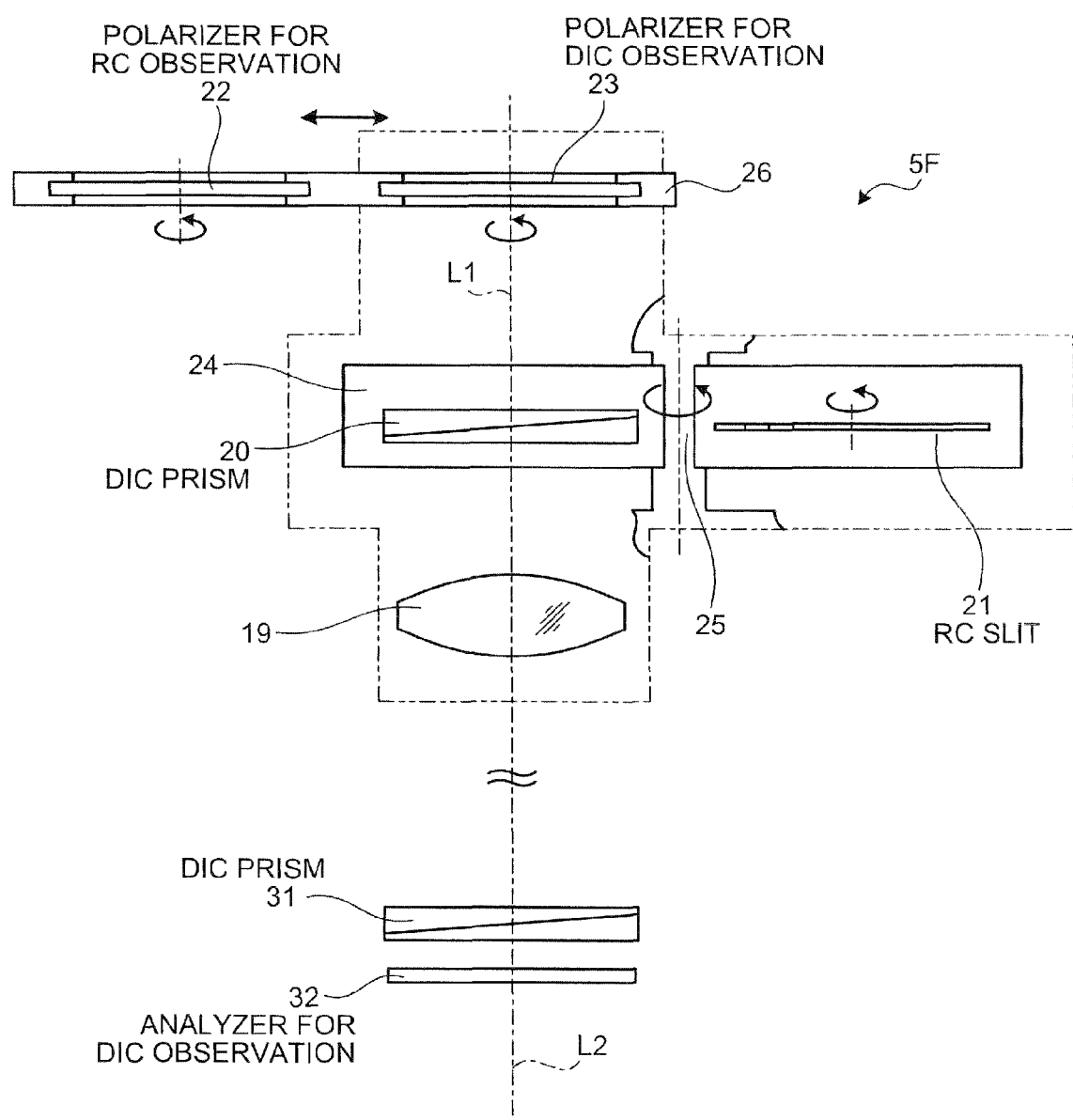
FIG. 21 is a schematic side view showing the extracted and enlarged condenser lens part and analyzer for DIC observation part in FIG. 20.
Figure 22:
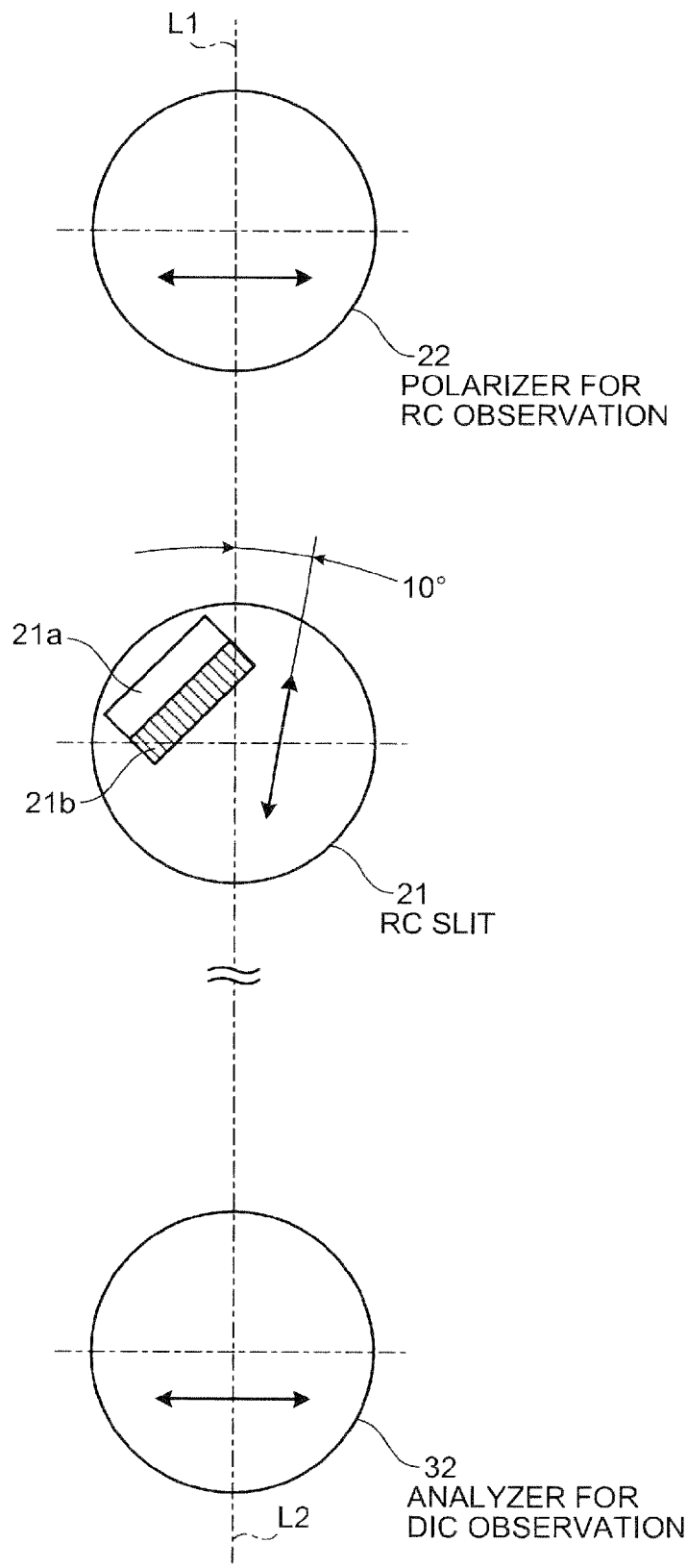
FIG. 22 is a schematic diagram showing parts of devices provided in the light axis at RC observation developed in a plane.

FIG. 20 is a schematic side view showing an overall configuration example of a microscope according to a sixth embodiment of the invention, FIG. 21 is a schematic side view showing the extracted and enlarged condenser lens part and analyzer for DIC observation part in FIG. 20, and FIG. 22 is a schematic diagram showing parts of devices provided in the light axis at RC observation developed in a plane.

The overall configuration of a microscope 1F according to the sixth embodiment shown in FIG. 20 is nearly the same as the overall configuration of the microscope 100 shown in FIG. 32, but the slider 33 is omitted with respect to the observation system and the DIC prism 31 and the analyzer for DIC observation 32 are fixedly provided in the observation light axis L2 as shown in FIG. 20.

Figure 33:
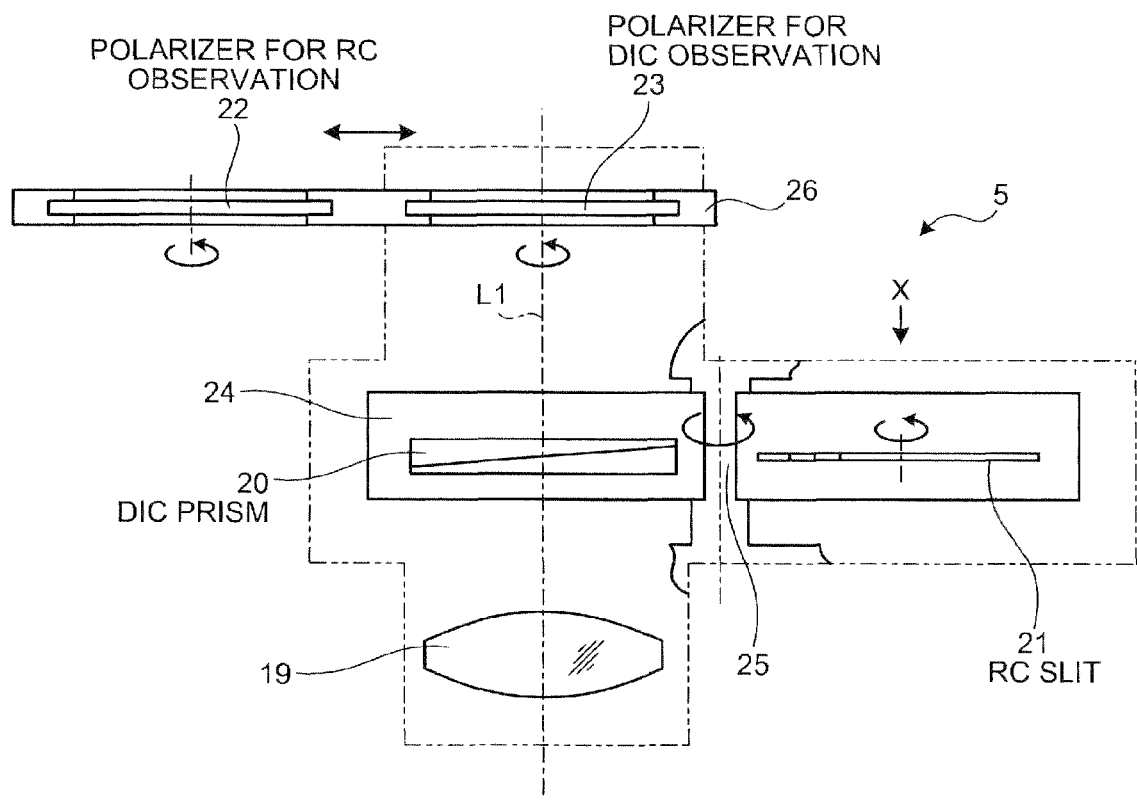
FIG. 33 is a schematic side view showing the extracted and enlarged condenser lens part in FIG. 32.
Figure 34:
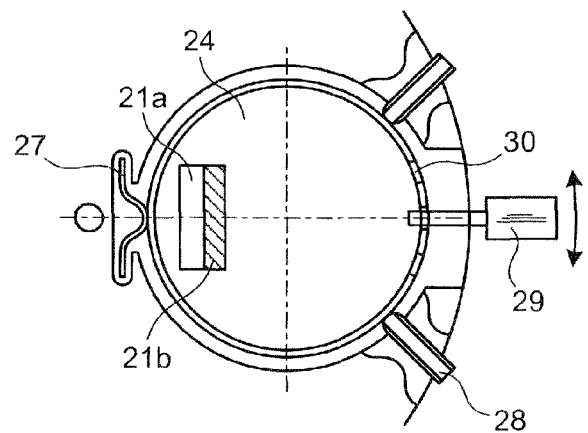
FIG. 34 is a plan view of the RC slit part in FIG. 33 seen from the direction of the arrow X.
Figure 35:
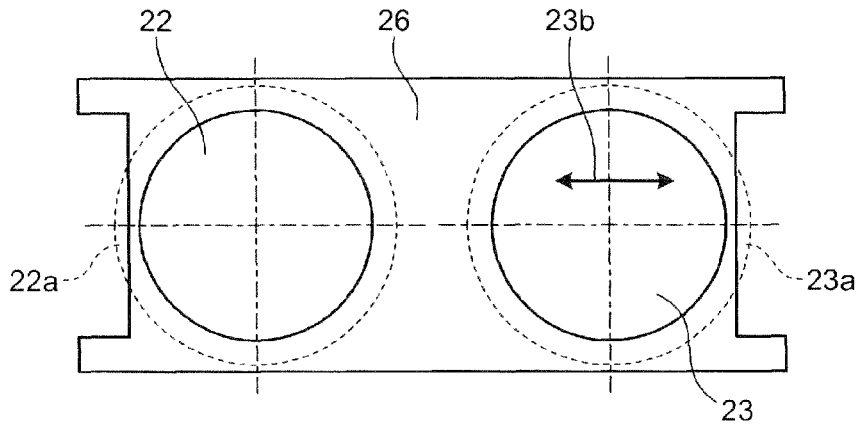
FIG. 35 is a plan view of the slider part in FIG. 33.
Figure 36:
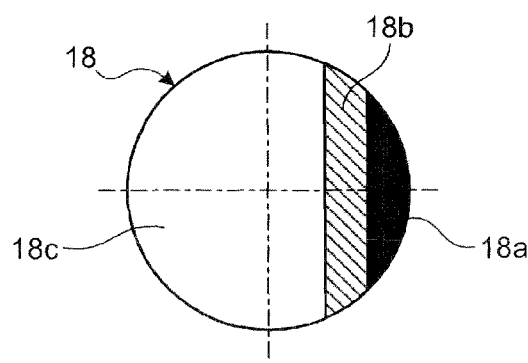
FIG. 36 is a plan view of the modulator shown in FIG. 32.
Figure 37:
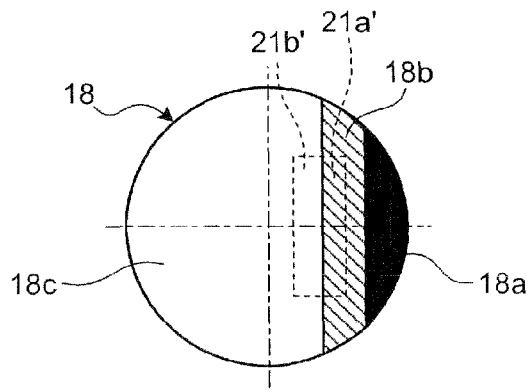
FIG. 37 is a plan view of the modulator shown in a positional relationship with the RC slit.

The component elements of a condenser lens 5F part are the same as those of the condenser lens 5 shown in FIG. 33. Here, for DIC observation, the vibration directions of the polarizer for DIC observation 23 and the analyzer for DIC observation 32 are set in a crossed Nicol condition. In addition, in the sixth embodiment, as schematically shown in FIG. 22, a parallel Nicol condition that the vibration directions of the analyzer for DIC observation 32 and the polarizer for RC observation 22 are the same direction is set. Note that the expression that the vibration directions are the same direction may not mean the directions are strictly the same, but mean they are nearly the same direction. Furthermore, with the setting change of the vibration direction of the polarizer for RC observation 22, the vibration direction of the polarization slit 21b of the RC slit 21 is also adjusted and changed in settings as shown in FIG. 22 (the modulator 18 is also adjusted according thereto).

As described above, according to the sixth embodiment, the vibration directions of the analyzer for DIC observation 32 and the polarizer for RC observation 22 are in the parallel Nicol condition, and the loss of the illumination light passing through the through-hole slit 21a of the RC slit 21 can be suppressed to an extremely small amount. Thereby, the DIC prism 31 and the analyzer for DIC observation 32 are fixedly provided in the observation light axis L2, the insertion and removal operation can be made unnecessary when the observation method is switched, and the number of times of the insertion and removal operation can be reduced.

Seventh Embodiment

Figure 23:
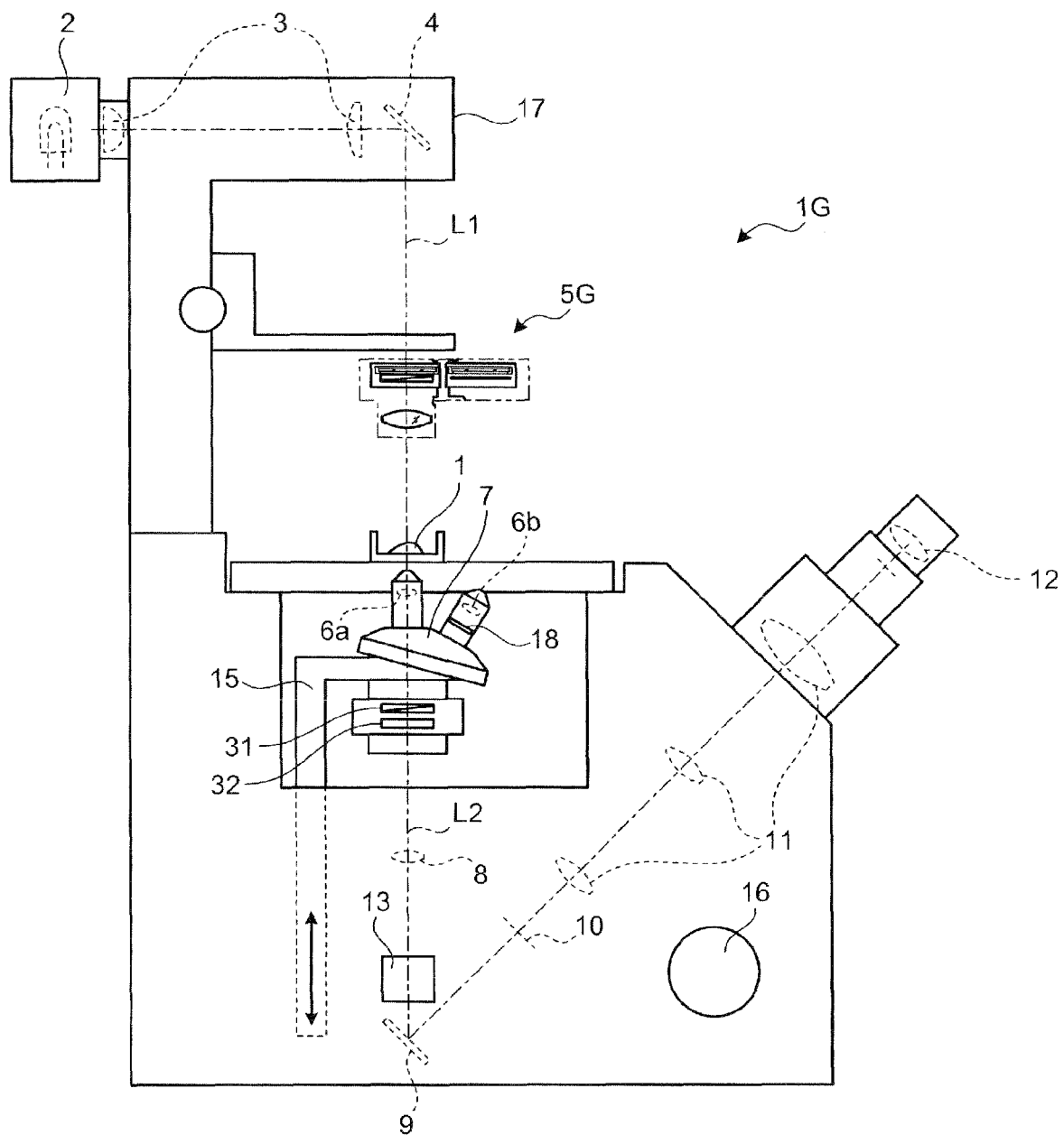
FIG. 23 is a schematic side view showing an overall configuration example of a microscope according to a seventh embodiment of the invention.
Figure 24:
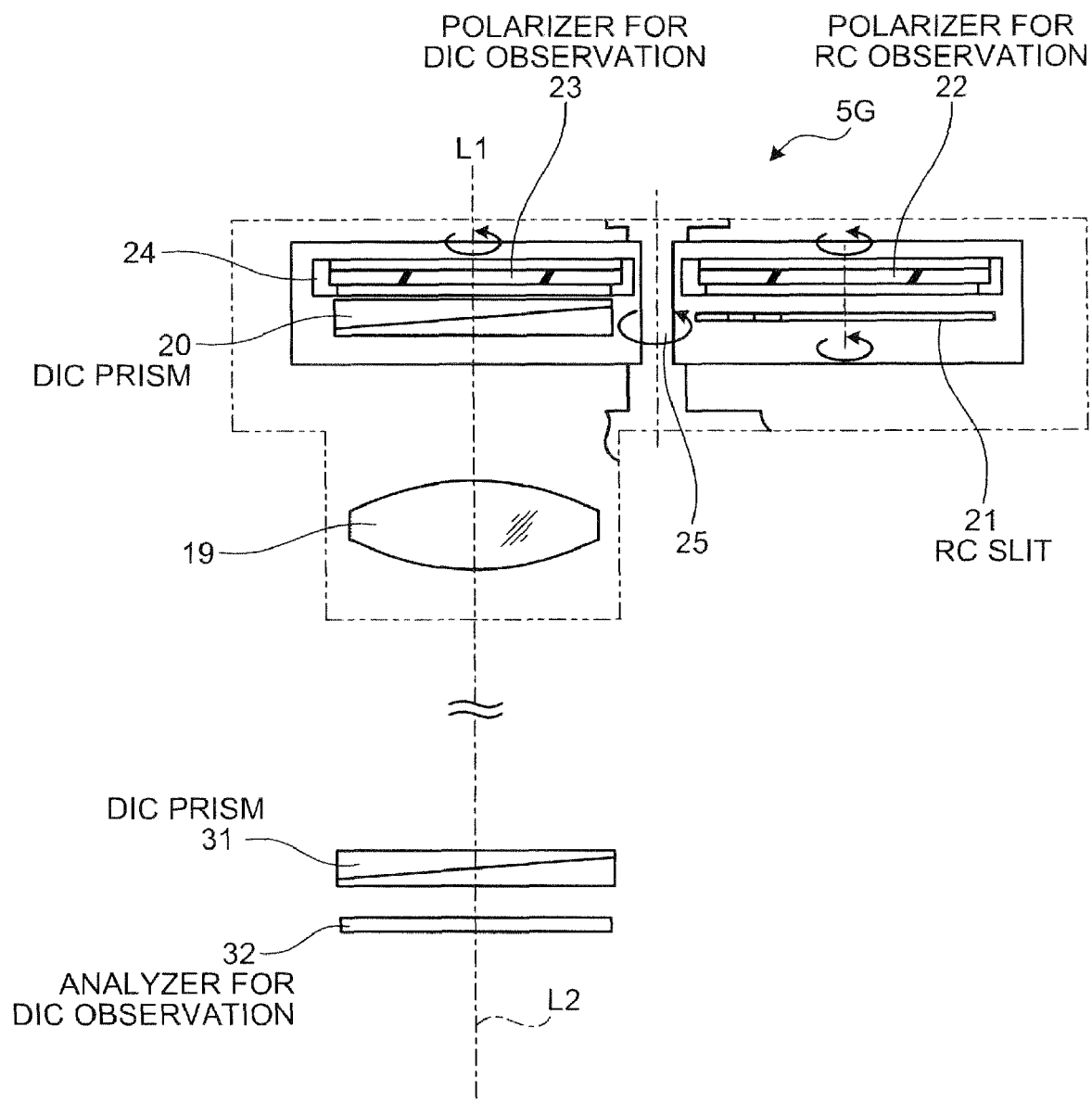
FIG. 24 is a schematic side view showing the extracted and enlarged condenser lens part and analyzer for DIC observation part in FIG. 23.
Figure 25:
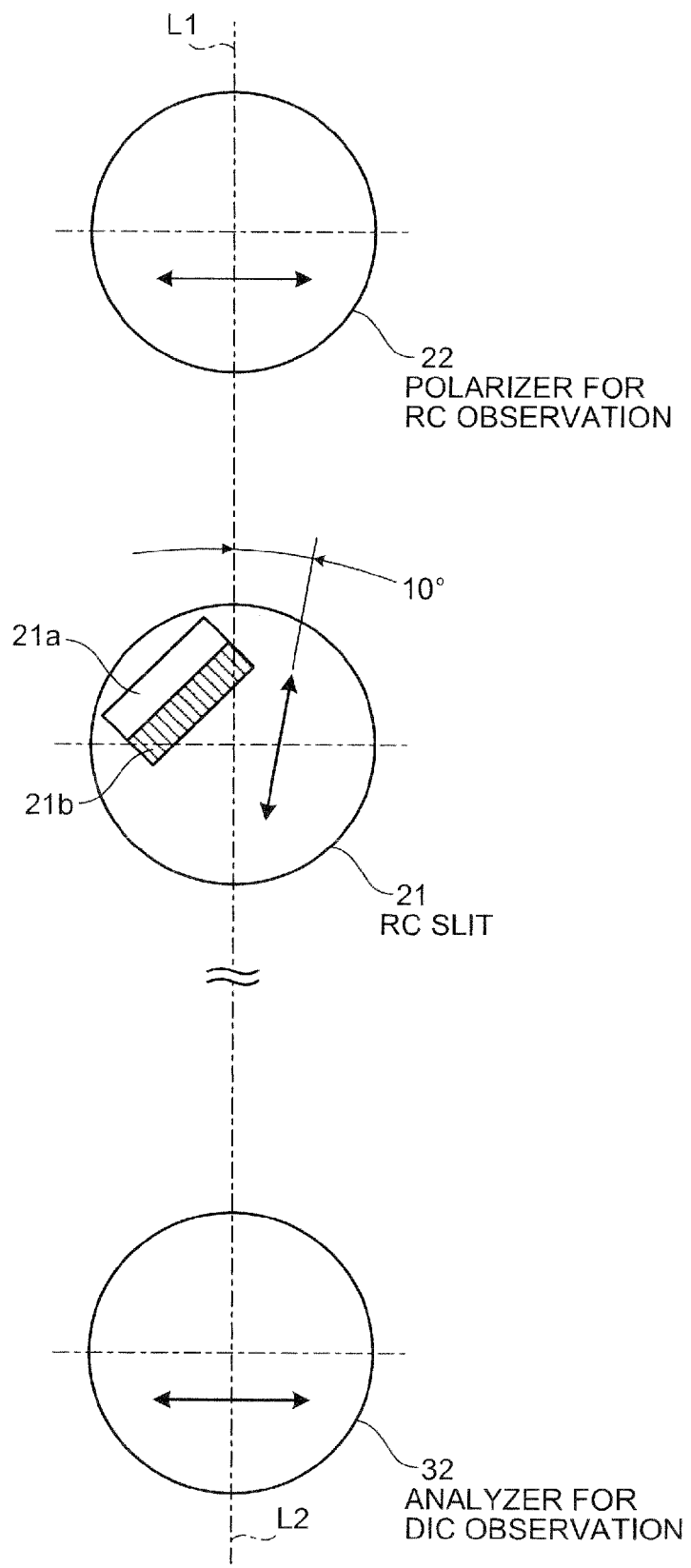
FIG. 25 is a schematic diagram showing parts of devices provided in the light axis at RC observation developed in a plane.

FIG. 23 is a schematic side view showing an overall configuration example of a microscope according to a seventh embodiment of the invention, FIG. 24 is a schematic side view showing the extracted and enlarged condenser lens part and analyzer for DIC observation part in FIG. 23, and FIG. 25 is a schematic diagram showing parts of devices provided in the light axis at RC observation developed in a plane.

The overall configuration of a microscope 1G according to the seventh embodiment shown in FIG. 23 is nearly the same as the overall configuration of the microscope 100 shown in FIG. 32, but the slider 33 is omitted with respect to the observation system and the DIC prism 31 and the analyzer for DIC observation 32 are fixedly provided in the observation light axis L2 as shown in FIG. 23.

Figure 38:
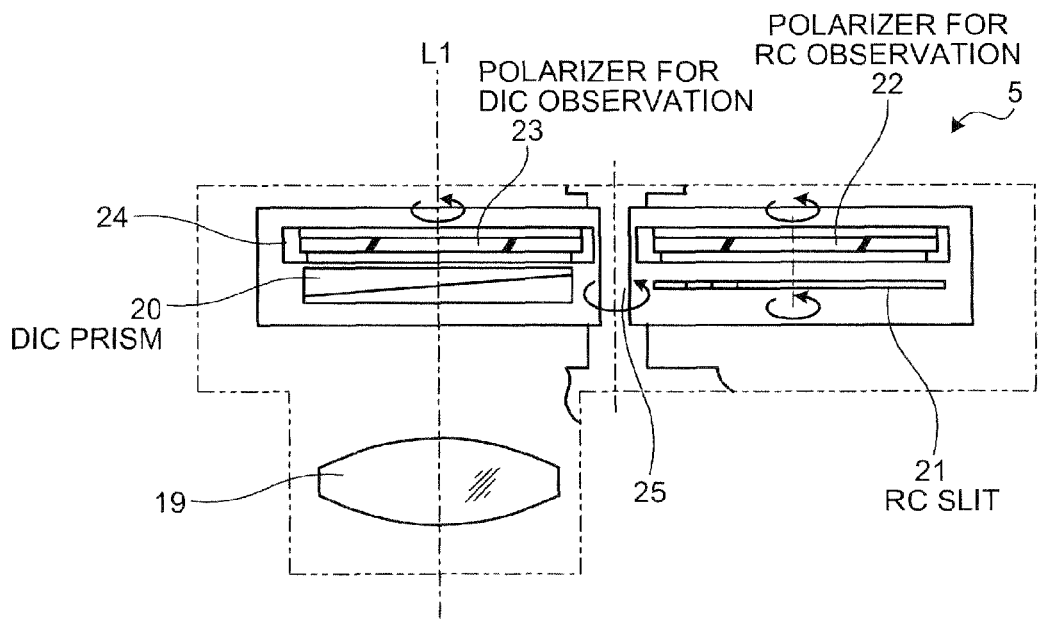
FIG. 38 is a schematic side view showing the extracted and enlarged conventional condenser lens part.

The component elements of a condenser lens 5G part are the same as those of the condenser lens 5 shown in FIG. 38. Here, for DIC observation, the vibration directions of the polarizer for DIC observation 23 and the analyzer for DIC observation 32 are set in a crossed Nicol condition. In addition, in the seventh embodiment, as schematically shown in FIG. 25, a parallel Nicol condition that the vibration directions of the analyzer for DIC observation 32 and the polarizer for RC observation 22 are the same direction is set. Note that the expression that the vibration directions are the same direction may not mean the directions are strictly the same, but mean they are nearly the same direction. Furthermore, with the setting change of the vibration direction of the polarizer for RC observation 22, the vibration direction of the polarization slit 21b of the RC slit 21 that forms a pair on the turret 24 is also adjusted and changed in settings as shown in FIG. 25 (the modulator 18 is also adjusted according thereto).

As described above, according to the seventh embodiment, the vibration directions of the analyzer for DIC observation 32 and the polarizer for RC observation 22 are in the parallel Nicol condition, and the loss of the illumination light passing through the through-hole slit 21a of the RC slit 21 can be suppressed to an extremely small amount. Thereby, the DIC prism 31 and the analyzer for DIC observation 32 are fixedly provided in the observation light axis L2, the insertion and removal operation can be made unnecessary when the observation method is switched, and the number of times of the insertion and removal operation can be reduced.

Eighth Embodiment

Figure 26:
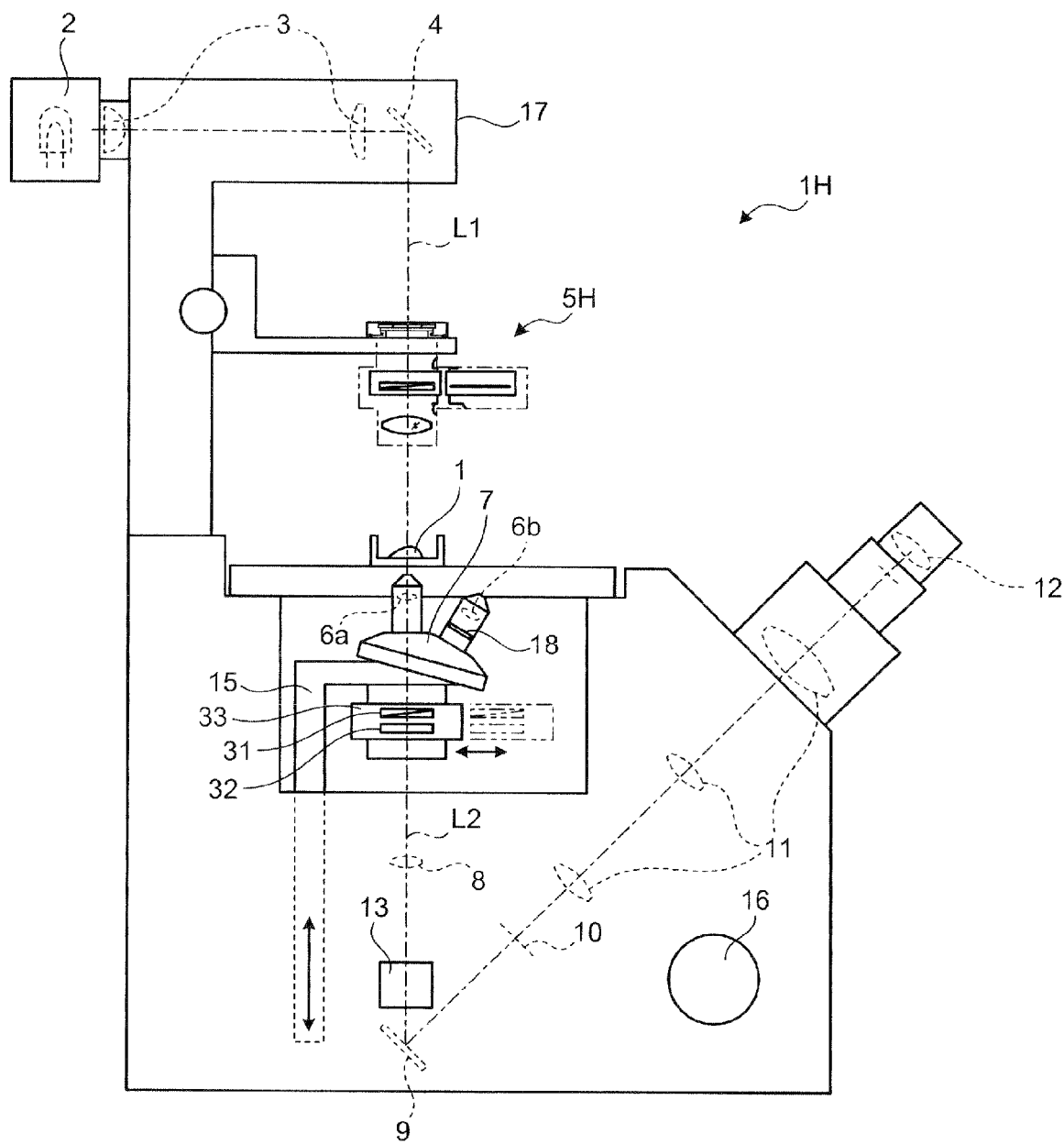
FIG. 26 is a schematic side view showing an overall configuration example of a microscope according to an eighth embodiment of the invention.
Figure 27:
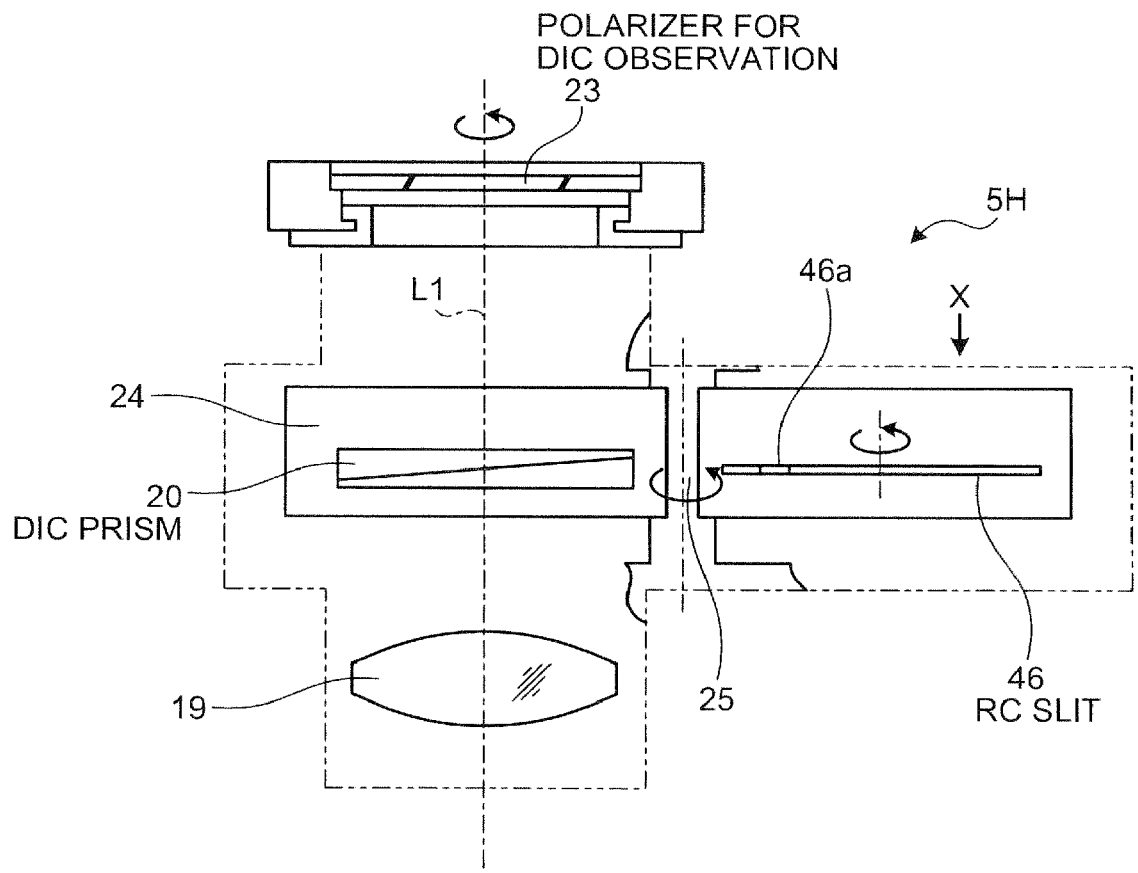
FIG. 27 is a schematic side view showing the extracted and enlarged condenser lens part and analyzer for DIC observation part in FIG. 26.
Figure 28:
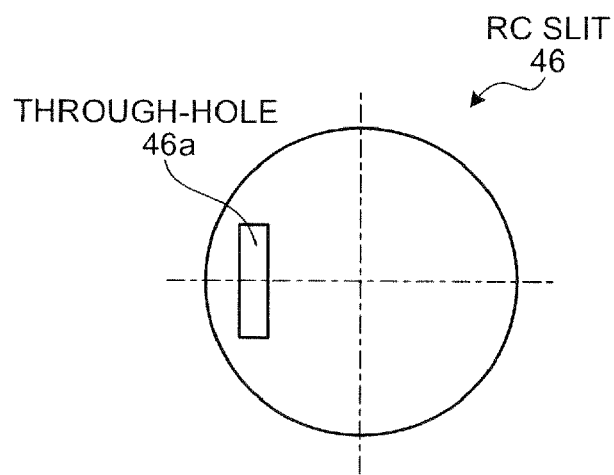
FIG. 28 is a plan view of an RC slit in FIG. 27 seen from the arrow X direction.

FIG. 26 is a schematic side view showing an overall configuration example of a microscope according to an eighth embodiment of the invention, FIG. 27 is a schematic side view showing the extracted and enlarged condenser lens part in FIG. 26, and FIG. 28 is a plan view of an RC slit in FIG. 27 seen from the arrow X direction.

The overall configuration of a microscope 1H according to the eighth embodiment shown in FIG. 26 is nearly the same as the overall configuration of the microscope 1B shown in FIG. 1, but the configuration of a condenser lens 5H part is different as shown in FIG. 26.

Here, referring to FIGS. 27 and 28, the configuration of the condenser lens 5H part will be described. In the eighth embodiment, in the illumination optical system, an RC slit 46 having only a through-hole slit 46a with a rectangular strip shape that transmits 100% of light but having no polarizing plate (polarizing slit) is used in place of the RC slit 21 as shown in FIG. 28. Since no polarizing plate is used when RC observation is made using the RC slit 46, the polarizer for RC observation 22 is omitted. Thereby, in the condenser lens 5H, the DIC prism 20 and the RC slit 46 are mounted on the turret 24 and provided insertably into and removably from the illumination light axis L1.

The RC observation method using the RC slit 46 having only the through-hole slit 46a has been known according to JP-A-2004-109919, for example. Schematically, the method uses the through-hole slit 46a in the rectangular strip shape of the RC slit 46 to run over by about 10% of the area 18c with transmittance of 100% of the modulator 18 to adjust the contrast of the specimen according to the degree of running over.

In this case, regarding the RC slit 46, as in the first embodiment, rotation and centering adjustment is performed and then the position of the through-hole slit 46a is displaced using the centering mechanism for contrast adjustment.

According to the eighth embodiment, since no polarizing plate (polarizer) is used at RC observation, if the polarizer for DIC observation 23 is present on the illumination light axis L1 at RC observation, the loss in brightness is little. Accordingly, at switching from DIC observation to RC observation, the insertion and removal operation of the polarizer for DIC observation 23 into and from the illumination light axis L1 is unnecessary, and the number of times of the insertion and removal operation can be reduced. Further, when the magnifying power of the objective lens 6b is changed in RC observation, if RC slits 46 corresponding to the respective magnifying power of the objective lenses 6b are once adjusted, readjustment is not necessary. The DIC prism 31 and the analyzer for DIC observation 32 can be insertably and removably positioned into and from the observation light axis L2 as shown by an arrow in FIG. 26 to prevent the loss in the mount of light that transmits the RC slit 46 at RC observation.

Ninth Embodiment

Figure 29:
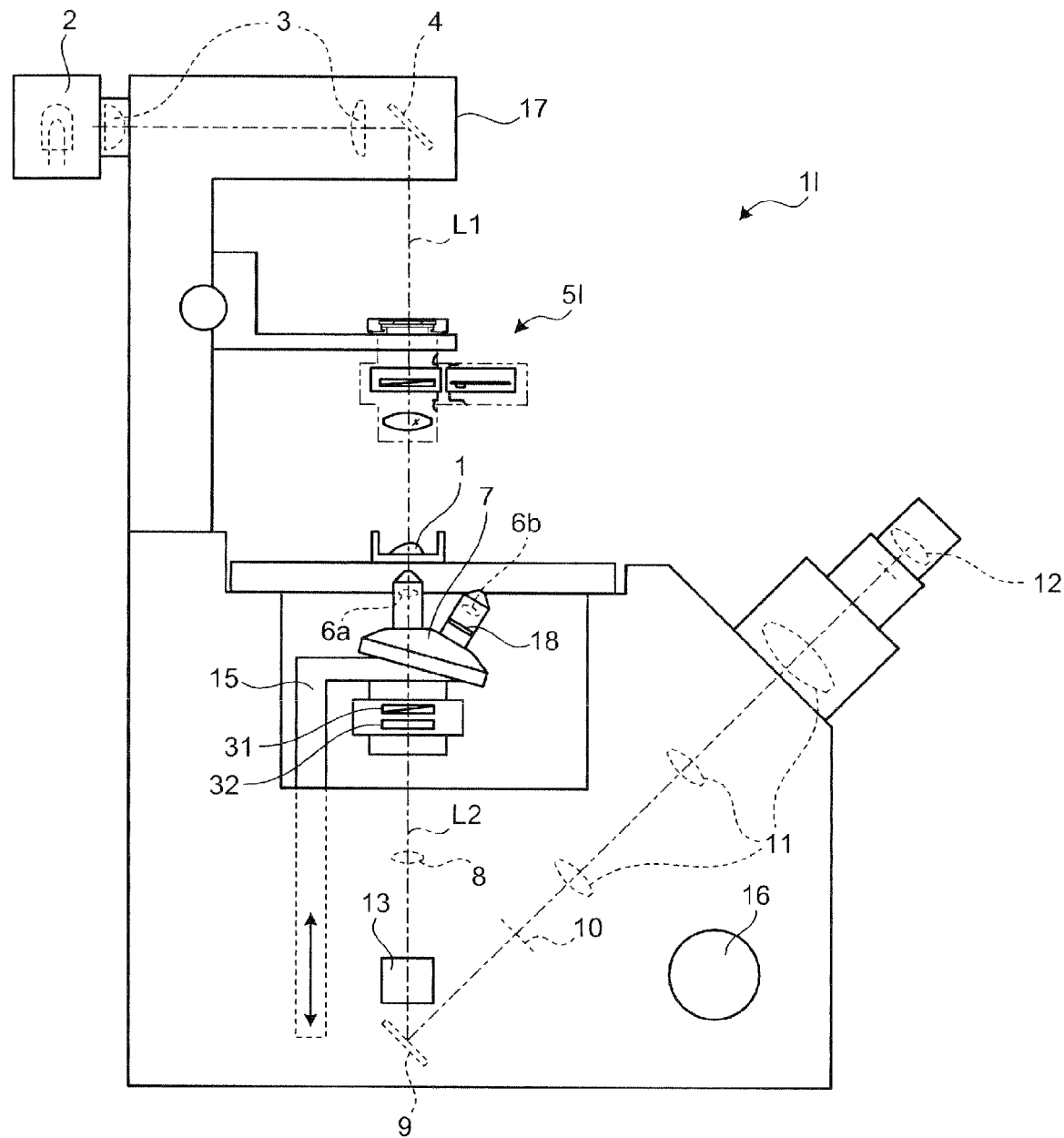
FIG. 29 is a schematic side view showing an overall configuration example of a microscope according to a ninth embodiment of the invention.
Figure 30:
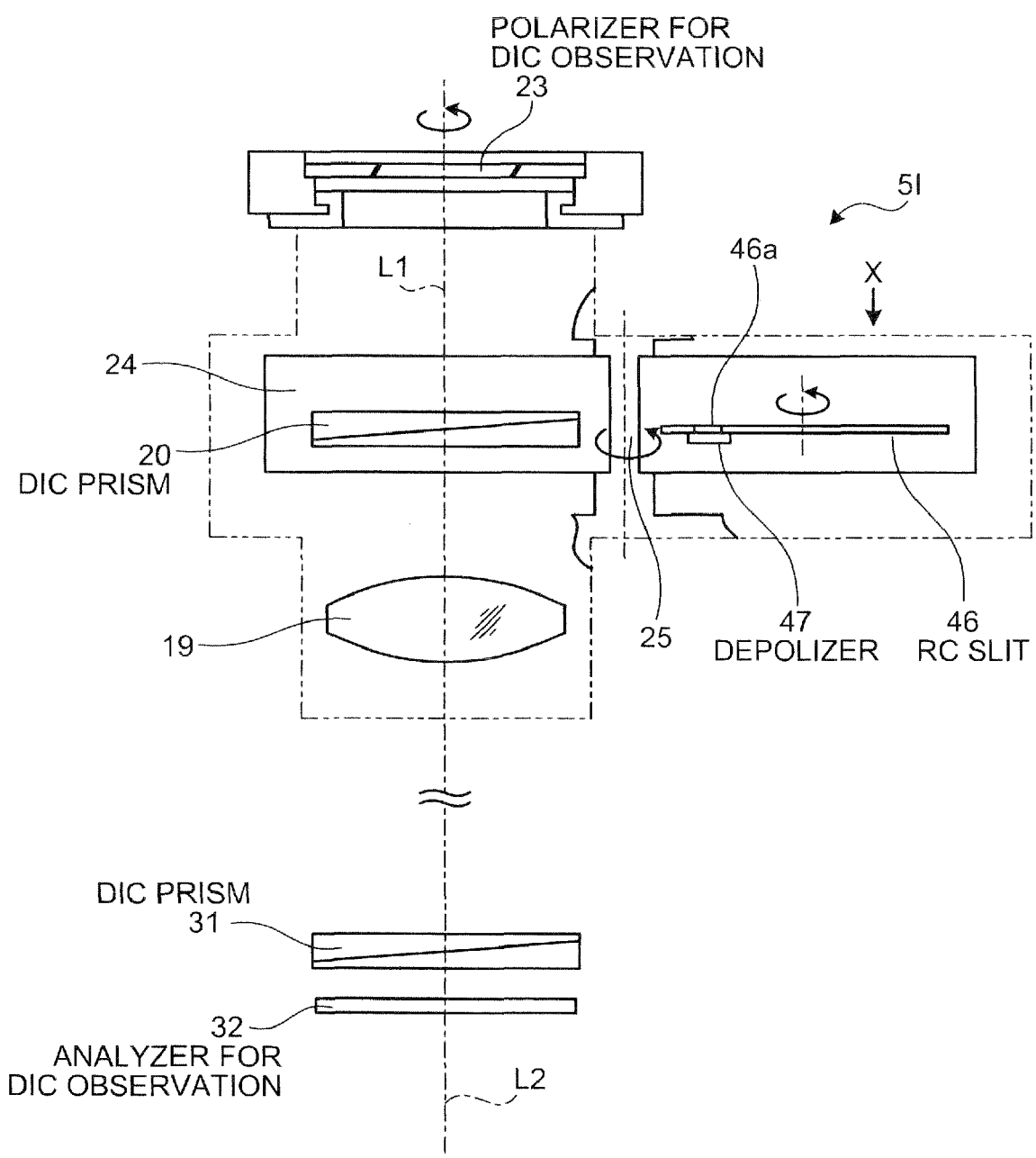
FIG. 30 is a schematic side view showing the extracted and enlarged condenser lens part and analyzer for DIC observation part in FIG. 26.

FIG. 29 is a schematic side view showing an overall configuration example of a microscope according to a ninth embodiment of the invention, and FIG. 30 is a schematic side view showing the extracted and enlarged condenser lens part in FIG. 29.

The overall configuration of a microscope 1I according to the ninth embodiment shown in FIG. 29 is nearly the same as the overall configuration of the microscope 1B shown in FIG. 8, but the configuration of a condenser lens 5I part is different as shown in FIG. 30. Further, the slider 33 is omitted with respect to the observation system and the DIC prism 31 and the analyzer for DIC observation 32 are fixedly provided in the observation light axis L2 as in FIG. 8.

Here, referring to FIG. 30, the configuration of the condenser lens 5I part will be described. In the ninth embodiment, as in the condenser lens 5H of the above described eighth embodiment, in the illumination optical system, an RC slit 46 having only a through-hole slit 46a with a rectangular strip shape that transmits 100% of light but having no polarizing plate (polarizing slit) is used in place of the RC slit 21 as shown in FIG. 28. Since no polarizing plate is used when RC observation is made using the RC slit 46, the polarizer for RC observation 22 is omitted. Thereby, in the condenser lens 5I, the DIC prism 20 and the RC slit 46 are mounted on the turret 24 and provided insertably into and removably from the illumination light axis L1, and only the polarizer for DIC observation 23 is fixedly provided in the illumination light axis L1 as a polarizer. Further, in the condenser lens 5I, a depolarizer 47 is bonded and fixed to the lower surface (the observation optical system side) of the through-hole slit 46a of the RC slit 46.

Also, in this case, regarding the RC slit 46, as in the first embodiment, rotation and centering adjustment is performed and then the position of the through-hole slit 46a is displaced using the centering mechanism for contrast adjustment.

According to the ninth embodiment, since no polarizing plate (polarizer) is used at RC observation, if the polarizer for DIC observation 23 exists on the illumination light axis L1 at RC observation, the loss in brightness is little. Accordingly, at switching from DIC observation to RC observation, the insertion and removal operation of the polarizer for DIC observation 23 to and from the illumination light axis L1 is unnecessary, and the number of times of the insertion and removal operation can be reduced. Further, when the magnifying power of the objective lens 6b is changed in RC observation, if RC slits 46 corresponding to the respective objective lenses 6b are once adjusted, readjustment is not necessary.

Further, in the ninth embodiment, in the observation optical system, the DIC prism 31 and the analyzer for DIC observation 32 also remain provided in the observation light axis L2. In this regard, the analyzer for DIC observation 32 is in a crossed Nicol condition with the vibration direction of the polarizer for DIC observation 23, and the loss of the illumination light passing through the through-hole slit 46a of the RC slit 46 becomes extremely great. However, the depolarizer 47 is provided on the lower surface of the through-hole slit 46a and the polarization state of the illumination light passing through the through-hole slit 46a is resolved, and thus, the loss in the amount of light can be suppressed in the analyzer for DIC observation 32 part. Thereby, the DIC prism 31 and the analyzer for DIC observation 32 are fixedly provided in the observation light axis L2 and the insertion and removal operation can be made unnecessary when the observation method is switched. Therefore, the necessary insertion and removal operation is only the rotational operation of the turret 24 that is essential for the switching of the observation method.

First Modification

Figure 31:
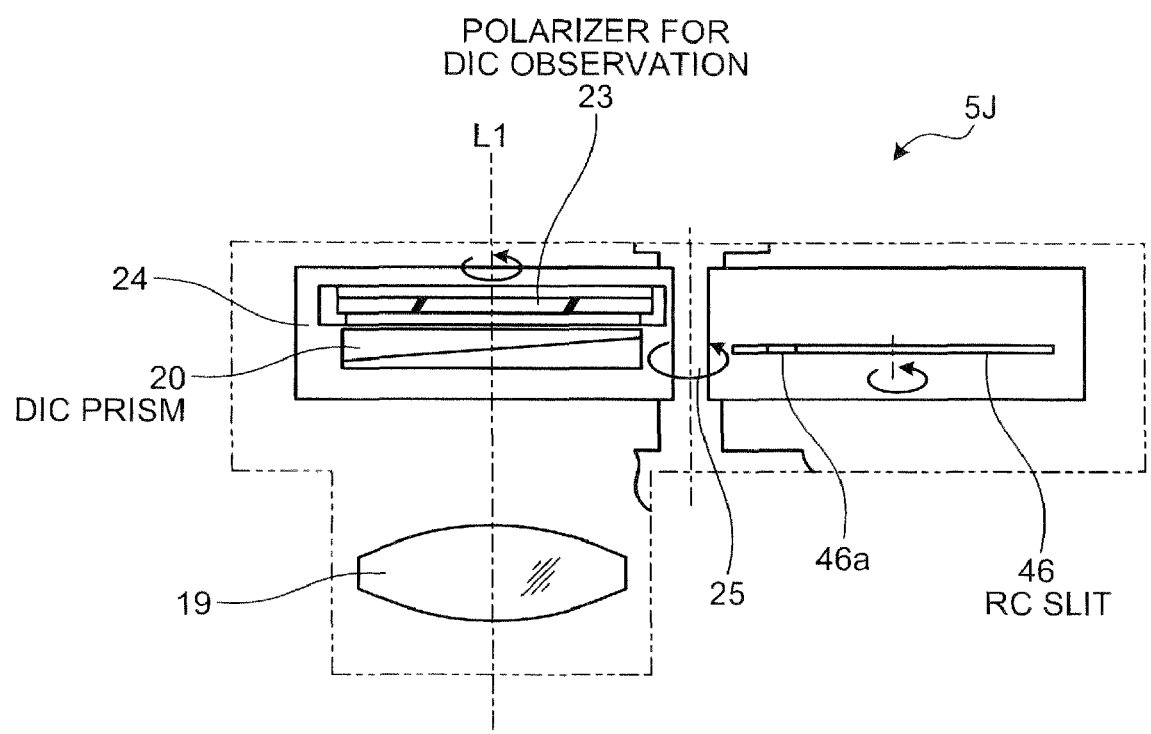
FIG. 31 is a schematic side view showing a condenser lens part of a first modification according to the ninth embodiment.

FIG. 31 is a schematic side view showing a condenser lens part of a first modification according to the ninth embodiment. In the condenser lens 5J of the first modification, also the polarizer for DIC observation 23 forming a pair with the DIC prism 20 is integrally provided on the turret 24. Thereby, when the RC slit 46 is inserted into the illumination light axis L1 for RC observation, the depolarizer 47 is unnecessary because the polarizer for DIC observation 23 comes off the illumination light axis L1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope comprising:
    a condenser lens that is provided in an illumination light path and in which at least one optical device is insertable into and removable from an illumination light axis for switching observation method;
    a first polarizing plate that is provided in the same light axis as the optical device and is insertable into and removable from the illumination light axis integrally with the optical device; and
    a second polarizing plate that is provided in the illumination light axis independently from insertion and removal of the optical device into and from the illumination light axis,
    wherein:
        the optical device is a slit for relief contrast with a third polarizing plate provided on a part thereof, the first polarizing plate is a polarizing plate for relief contrast, the second polarizing plate is a polarizing plate for differential interference or a polarizing plate for polarization observation, vibration directions of the first polarizing plate and the second polarizing plate are nearly the same, and the microscope further comprises:

a fourth polarizing plate for differential interference or polarization observation fixedly provided in an observation light axis; and a depolarizer provided in a position at the fourth polarizing plate side with respect to the slit for relief contrast.

2. The microscope according to claim 1, wherein the second polarizing plate is insertable into and removable from the illumination light axis independently from insertion and removal of the optical device into and from the illumination light axis.

3. The microscope according to claim 1, wherein the second polarizing plate is fixedly provided in the illumination light axis.

4. A microscope comprising:

an illumination light source for illuminating a specimen;

an objective lens for observing the specimen;

an imaging lens for imaging an image of the specimen from the objective lens;

a first polarizing plate that is provided in an observation light axis between the objective lens and the imaging lens;

a condenser lens that is provided in an illumination light path on an illumination light axis between the illumination light source and the specimen;

a turret for arranging in the illumination light axis at least one optical device at the illumination light source side of a lens of the condenser lens;

a slit and a second polarizing plate that are provided in the turret as an optical device to be arranged in the illumination light axis; and a third polarizing plate provided between the turret and the illumination light source;

a first prism for differential interference contrast observation provided in the observation light axis between the objective lens and the imaging lens;

a second prism for differential interference contrast observation provided in the turret as an optical device to be arranged in the illumination light axis; and a depolarizer provided in a position at an observation optical system side of the slit, wherein observation methods are switched in a state where vibration directions of the second polarizing plate and the third polarizing plate are nearly the same or in a state where vibration directions of the first polarizing plate and the second polarizing plate are nearly the same.

5. The microscope according to claim 4, wherein:

for differential interference contrast observation, the first prism for differential interference contrast observation and the first polarizing plate are provided in the observation light axis, and the third polarizing plate and the second prism for differential interference contrast observation of the turret are provided in the illumination light axis, for relief contrast observation, the first prism for differential interference contrast observation and the first polarizing plate are provided in the observation light axis, and the third polarizing plate, the slit in the turret and the second polarizing plate are provided in the illumination light axis, the first prism for differential interference contrast observation and the first polarizing plate are fixedly provided in the observation light axis irrespective of the observation method switching, and the observation methods are switched in a state where vibration directions of the second polarizing plate and the third polarizing plate are nearly the same.

6. The microscope according to claim 4, wherein the slit comprises a through-hole slit and a polarization slit, the vibration directions of the first polarizing plate and the second polarizing plate are set to provide a crossed Nicol condition, the vibration directions of the second polarizing plate and the third polarizing plate are nearly the same, and the polarization slit and the second polarizing plate are slightly deviated from the crossed Nicol condition.

7. The microscope according to claim 4, wherein the turret has a through hole.

8. The microscope according to claim 4, wherein the third polarizing plate is fixedly provided between the turret and the illumination light source.

* * * * *